United States Patent
Veregin et al.

(10) Patent No.: US 11,126,103 B2
(45) Date of Patent: Sep. 21, 2021

(54) CROSS-LINKED POLYMERIC LATEX PREPARED WITH A LOW SURFACE TENSION SURFACTANT

(71) Applicant: Xerox Corporation, Norwalk, CT (US)

(72) Inventors: Richard P. N. Veregin, Mississauga (CA); Shivanthi Easwari Sriskandha, Mississauga (CA); David R. Kurceba, Hamilton (CA); Scott Edward Silver, Guelph (CA); Melanie Lynn Davis, Hamilton (CA); Cuong Vong, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/892,967

(22) Filed: Jun. 4, 2020

(65) Prior Publication Data

US 2020/0310274 A1 Oct. 1, 2020

Related U.S. Application Data

(62) Division of application No. 16/369,206, filed on Mar. 29, 2019, now Pat. No. 10,725,394.

(51) Int. Cl.

| | |
|---|---|
| *G03G 9/00* | (2006.01) |
| *G03G 9/097* | (2006.01) |
| *G03G 9/08* | (2006.01) |
| *G03G 9/093* | (2006.01) |
| *C08K 5/41* | (2006.01) |
| *C08K 5/42* | (2006.01) |

(52) U.S. Cl.
CPC .......... *G03G 9/09775* (2013.01); *C08K 5/41* (2013.01); *C08K 5/42* (2013.01); *G03G 9/0804* (2013.01); *G03G 9/0819* (2013.01); *G03G 9/09392* (2013.01); *G03G 9/09708* (2013.01); *G03G 9/09725* (2013.01); *G03G 9/09733* (2013.01); *C08K 2201/013* (2013.01)

(58) Field of Classification Search
CPC ...... C08K 5/41; C08K 5/42; C08K 2201/013; G03G 9/09775; G03G 9/0804; G03G 9/09392; G03G 9/09725; G03G 9/0819; G03G 9/09708; G03G 9/09733
USPC .................................................. 430/108.22
See application file for complete search history.

(56) References Cited

U.S. PATENT DOCUMENTS

2012/0156605 A1* 6/2012 Vanbesien .......... G03G 9/09708
430/108.2

* cited by examiner

*Primary Examiner* — Mark A Chapman
(74) *Attorney, Agent, or Firm* — Marylou J. Lavoie, Esq. LLC

(57) ABSTRACT

A polymeric composition including a copolymer comprising a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; and optionally, a third monomer comprising an amine, wherein the third monomer is present in an amount of from about 0.1 percent by weight to about 1.5 percent by weight, based on the weight of the copolymer; and a surfactant, wherein the surfactant has a minimum surface tension at critical micelle concentration of less than about 30 mN/m. A toner including the copolymer as a toner surface additive. An emulsion aggregation toner process including the copolymer as a toner surface additive.

14 Claims, No Drawings

CROSS-LINKED POLYMERIC LATEX PREPARED WITH A LOW SURFACE TENSION SURFACTANT

RELATED APPLICATIONS

This application is a divisional of U.S. application Ser. No. 16/369,206, filed Mar. 29, 2019, the disclosure of which is totally incorporated by reference herein.

Commonly assigned U.S. patent application Ser. No. 16/369,013, entitled "Toner Compositions And Processes Including Polymer Toner Additives"), filed concurrently herewith, which is hereby incorporated by reference herein in its entirety, describes a polymeric composition including a copolymer comprising a first monomer having a high carbon to oxygen ratio of from about 3 to about 8; a second monomer comprising two or more vinyl groups, wherein the second monomer is present in the copolymer in an amount of from greater than about 8 percent by weight to about 60 percent by weight, based on the weight of the copolymer; and a third monomer comprising an amine, wherein the third monomer is present in an amount of from about 0.5 percent by weight to about 5 percent by weight, based on the weight of the copolymer. A toner including the copolymer as a toner surface additive. An emulsion aggregation toner process including the copolymer as a toner surface additive.

Commonly assigned U.S. patent application Ser. No. 16/369,126, entitled "Toner Compositions And Processes Having Reduced Or No Titania Surface Additives"), filed concurrently herewith, which is hereby incorporated by reference herein in its entirety, describes a toner including toner particles comprising at least one resin, in combination with an optional colorant, and an optional wax; and a copolymer toner additive on at least a portion of an external surface of the toner particles, the copolymer toner additive comprising a first monomer having a high carbon to oxygen ratio of from about 3 to about 8; and a second monomer comprising two or more vinyl groups, wherein the second monomer is present in the copolymer in an amount of from greater than about 8 percent by weight to about 60 percent by weight, based on the weight of the copolymer; wherein the copolymer toner additive has a volume average particle diameter of from about 20 nanometers to less than about 70 nanometers. An emulsion aggregation toner process including the copolymer as a toner surface additive.

Commonly assigned U.S. patent application Ser. No. 16/369,278, entitled "Surface Additive For Three-Dimensional Polymeric Printing Powders"), filed concurrently herewith, which is hereby incorporated by reference herein in its entirety, describes a composition including a three-dimensional polymeric printing powder; an organic polymeric additive on at least a portion of an external surface of the three-dimensional polymeric printing powder; wherein the organic polymeric additive is optionally cross-linked; and optionally, an inorganic additive on at least a portion of an external surface of the three-dimensional polymeric printing powder. A process for preparing a three-dimensional polymeric printing powder having an organic polymeric additive disposed thereon. A process for employing the three-dimensional polymeric printing powder including selective laser sintering.

Commonly assigned U.S. patent application Ser. No. 16/369,359, entitled "Process For Preparing A Three-Dimensional Printing Composition"), filed concurrently herewith, which is hereby incorporated by reference herein in its entirety, describes a process including providing a three-dimensional printing powder dispersion comprising a three-dimensional printing powder, an optional dispersing agent, and water; providing an emulsion of an organic polymeric additive; combining the three-dimensional printing powder dispersion and the emulsion of organic polymeric additive to form a mixture comprising the three-dimensional printing powder dispersion and the emulsion of organic polymeric additive; and drying the mixture of the three-dimensional printing powder dispersion and the emulsion of organic polymeric additive.

Commonly assigned U.S. patent application Ser. No. 16/369,449, entitled "Surface Additive For Three-Dimensional Metal Printing Compositions"), filed concurrently herewith, which is hereby incorporated by reference herein in its entirety, describes a composition including a three-dimensional metal printing powder; an organic polymeric additive on at least a portion of an external surface of the three-dimensional metal printing powder; and optionally, an inorganic additive on at least a portion of an external surface of the three-dimensional metal printing powder. A process for preparing a three-dimensional metal printing powder having an organic polymeric additive disposed thereon. A process for employing the three-dimensional metal printing powder including selective laser sintering.

BACKGROUND

Disclosed herein is a polymeric composition comprising a copolymer comprising a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; and optionally, a third monomer comprising an amine, wherein the third monomer, if present, is present in an amount of from about 0.1 percent by weight to about 1.5 percent by weight, based on the weight of the copolymer; and a surfactant, wherein the surfactant has a minimum surface tension at critical micelle concentration of less than about 30 mN/m.

Further disclosed herein is a toner comprising toner particles comprising at least one resin, in combination with an optional colorant, and an optional wax; and a copolymer toner surface additive on at least a portion of an external surface of the toner particles, the copolymer toner surface additive comprising a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; and optionally, a third monomer comprising an amine, wherein the third monomer, if present, is present in an amount of from about 0.1 percent by weight to about 1.5 percent by weight, based on the weight of the copolymer; and a surfactant, wherein the surfactant has a minimum surface tension at critical micelle concentration of less than about 30 mN/m; wherein the copolymer toner additive has a volume average particle diameter of from about 20 nanometers to less than 70 nanometers.

Further disclosed is a toner process comprising contacting at least one resin; an optional wax; an optional colorant; and an optional aggregating agent; heating to form aggregated toner particles; optionally, adding a shell resin to the aggregated toner particles, and heating to a further elevated temperature to coalesce the particles; adding a surface additive, wherein the surface additive comprises: a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; optionally, a third monomer comprising an amine, wherein the third monomer, if present, is present in an amount of from about 0.1 percent by weight to about 1.5 percent by weight, based on the weight of the copolymer; and a surfactant, wherein the surfactant has a minimum surface tension at critical micelle concentration of less than about 30 mN/m; wherein the copolymer toner surface additive has a volume average particle diameter of from about 20 nanometers to less than 70 nanometers; and optionally, recovering the toner particles.

Electrophotographic printing utilizes toner particles which may be produced by a variety of processes. One such process includes an emulsion aggregation ("EA") process that forms toner particles in which surfactants are used in forming a latex emulsion. See, for example, U.S. Pat. No. 6,120,967, the disclosure of which is hereby incorporated by reference herein in its entirety, as one example of such a process.

Combinations of amorphous and crystalline polyesters may be used in the EA process. This resin combination may provide toners with high gloss and relatively low-melting point characteristics (sometimes referred to as low-melt, ultra low melt, or ULM), which allows for more energy efficient and faster printing.

The use of additives with EA toner particles may be important in realizing optimal toner performance, such as, for providing improved charging characteristics, improved flow properties, and the like. Poor fusing creates problems in paper adhesion and print performance. Poor toner flow cohesion can affect toner dispense, which creates problems in gravity-fed cartridges, and leads to deletions on paper. In addition, the use of additives with EA toner particles may also mitigate bias charge roller (BCR) contamination.

U.S. Pat. No. 8,663,886, which is hereby incorporated by reference herein in its entirety, describes in the Abstract thereof polymeric additives for use with toner particles. The polymeric additive includes a copolymer possessing at least one monomer having a high carbon to oxygen ration, a monomer having more than one vinyl group, and at least one amine-functional monomer.

U.S. patent application Ser. No. 15/914,411 of Richard P. N. Veregin et al., entitled "Toner Compositions And Surface Polymer Additives," which is hereby incorporated by reference herein in its entirety, describes in the Abstract thereof a polymeric composition for use with toner particles. The polymeric composition includes a silicone-polyether copolymer and a polymeric additive, wherein the silicone-polyether copolymer comprises a polysiloxane unit and a polyether unit, and the polymeric additive comprises a copolymer possessing at least one monomer having a high carbon to oxygen ratio, a monomer having more than one vinyl group, and at least one amine-functional monomer.

There is a continual need for improving the additives used in toners, including formation of EA toners, especially low-melt EA toners to improve toner flow and reduce BCR contamination. There is also a continual need to develop lower cost EA toners.

Due to certain regulatory requirements, compositions, including toners, having one percent or more titania are expected to require special labeling. Further, having titania in a toner formulation is anticipated to be an issue for Blue Angel certifications. In addition, silica and titania additives add considerable cost to the toner formulation. Thus, there is a desire to reduce or eliminate titania in toner formulations.

Currently available toner compositions and processes are suitable for their intended purposes. However a need remains for improved toner compositions and processes. Further, a need remains for reduced cost toner compositions and processes. Further, a need remains for toner compositions having performance characteristics as well or better than prior compositions while meeting the desire for reduced amounts of titania. Further, a need remains for toner compositions, in embodiments, color toner compositions, that can perform as desired without requiring titania additives.

The appropriate components and process aspects of the each of the foregoing U.S. patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a polymeric composition comprising a copolymer comprising a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; and optionally, a third monomer comprising an amine, wherein the third monomer, if present, is present in an amount of from about 0.1 percent by weight to about 1.5 percent by weight, based on the weight of the copolymer; and a surfactant, wherein the surfactant has a minimum surface tension at critical micelle concentration of less than about 30 mN/m.

Also described is a toner comprising toner particles comprising at least one resin, in combination with an optional colorant, and an optional wax; and a copolymer toner surface additive on at least a portion of an external surface of the toner particles, the copolymer toner surface additive comprising a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; and optionally, a third monomer comprising an amine, wherein the third monomer, if present, is present in an amount of from about 0.1 percent by weight to about 1.5 percent by weight, based on the weight of the copolymer; and a surfactant, wherein the surfactant has a minimum surface tension at critical micelle concentration of less than about 30 mN/m; wherein the copolymer toner additive has a volume average particle diameter of from about 20 nanometers to less than 70 nanometers.

Also described is a toner process comprising contacting at least one resin; an optional wax; an optional colorant; and an optional aggregating agent; heating to form aggregated toner particles; optionally, adding a shell resin to the aggregated toner particles, and heating to a further elevated temperature to coalesce the particles; adding a surface additive, wherein the surface additive comprises: a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; optionally, a third monomer comprising an amine, wherein the third monomer, if present, is present in an amount of from about 0.1 percent by weight to about 1.5 percent by weight, based on the weight of the copolymer; and a surfactant, wherein the surfactant has a minimum surface tension at critical micelle concentration of less than about 30 mN/m; wherein the copolymer toner surface additive has a volume average particle diameter of from about 20 nanometers to less than 70 nanometers; and optionally, recovering the toner particles.

DETAILED DESCRIPTION

A cross-linked polymeric toner surface additive is provided which reduces or eliminates altogether the necessity of titania surface additives in toner formulations. The cross-linked polymeric toner surface additive is prepared with a surfactant having a low surface tension, such as a surface tension of less than 30 mN/m, at the critical micelle concentration at 25° C. In some cases, the critical micelle concentration of a surfactant cannot be reached due to the surfactant reaching its solubility limit, for example. In that case, the surfactant herein may be chosen to have a low minimum surface tension. The cross-linked polymeric surface additive is a latex formed using emulsion polymerization, wherein the latex, in embodiments, comprises a monomer having a high carbon to oxygen (C/O) ratio, a monomer with two or more vinyl groups, and, optionally, a monomer containing an amine functionality. The monomers form a cross-linked polymer which, in embodiments, is less than 50 nanometers in size (volume average particle diameter, as measured by a Nanotrac NPA252 from Microtrac, Inc.). It was surprisingly found that a cross-linked polymer surface additive having a smaller size than previous additives, could be achieved by selection of a specific surfactant having a lower surface tension at the critical micelle concentration. The cross-linked property of the polymer surface additive further provides mechanical robustness required in the developer housing.

In embodiments, a polymeric composition is provided comprising a copolymer comprising a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; and optionally, a third monomer comprising an amine, wherein the third monomer, if present, is present in an amount of from about 0.5 percent by weight to about 1.5 percent by weight, based on the weight of the copolymer; and a surfactant, wherein the surfactant has a minimum surface tension at critical micelle concentration of less than about 30 mN/m.

The polymeric surface additive, also termed herein a polymeric toner additive or a copolymer or copolymer toner additive, in embodiments, is a latex formed using emulsion polymerization. The latex includes at least one monomer with a high carbon to oxygen (C/O) ratio combined with a monomer possessing two or more vinyl groups, optionally combined with a monomer containing an amine functionality. The aqueous latex is then dried and can be used in place of, or in conjunction with, other toner additives. The use of a high C/O ratio monomer provides good relative humidity (RH) stability, and the use of the amine functional monomer provides desirable charge control for the resulting toner composition. The use of a monomer possessing two or more vinyl groups, sometimes referred to herein, in embodiments, as a crosslinking monomer or a crosslinking vinyl monomer, provides a crosslinked property to the polymer, thereby providing mechanical robustness required in the developer housing.

The resulting polymer may be used as an additive with toner compositions, providing the resulting toner with enhanced sensitivity to relative humidity and charge stability. The polymeric additives herein may be used at a lower density compared with other additives, so that much less material by weight is required for equivalent surface area coverage, compared to inorganic additives, including oxides such as titania and silica. The polymeric additives of the present disclosure may also provide toner particles with a wide range of properties including hydrophobicity and charge control, depending on the monomers used in the formation of the polymers.

As used herein, a polymer or co-polymer is defined by the monomer(s) from which a polymer is made. Thus, for example, while in a polymer made using an acrylate monomer as a monomer reagent, an acrylate moiety per se no longer exists because of the polymerization reaction, as used herein, that polymer is said to comprise the acrylate monomer. Thus, an organic polymeric additive made by a process disclosed herein can be prepared, for example, by the polymerization of monomers including cyclohexyl methacrylate, divinyl benzene, and dimethylaminoethylmethacrylate. The resulting organic polymeric additive can be said to comprise cyclohexyl methacrylate as that monomer was used to make the organic polymeric additive; can be said to be composed of or as comprising divinyl benzene as divinyl benzene is a monomer reagent of that polymer; and so on. Hence, a polymer is defined herein based on one or more of the component monomer reagents, which provides a means to name the organic polymeric additives herein.

As noted above, the polymeric additive may be in a latex. In embodiments, a latex copolymer utilized as the polymeric surface additive may include a first monomer having a high C/O ratio, such as an acrylate or a methacrylate. The C/O ratio of such a monomer may be from about 3 to about 8, in embodiments, from about 4 to about 7, or from about 5 to about 6. In embodiments, the monomer having a high C/O ratio may be an aliphatic cycloacrylate. Suitable aliphatic cycloacrylates which may be utilized in forming the polymer additive include, for example, cyclohexyl methacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, isobornyl acrylate, benzyl methacrylate, phenyl methacrylate, combinations thereof, and the like.

The first monomer having a high carbon to oxygen ratio, in embodiments, a cycloacrylate, may be present in the copolymer utilized as a polymeric additive in any suitable or desired amount. In embodiments, the cycloacrylate may be present in the copolymer in an amount of from about 40 percent by weight of the copolymer to about 99.4 percent by weight of the copolymer, or from about 50 percent by weight of the copolymer to about 95 percent by weight of the copolymer, or from about 60 percent by weight of the copolymer to about 95 percent by weight of the copolymer. In embodiments, the first monomer is present in the copolymer in an amount of from about 40 percent by weight to about 90 percent by weight, based on the weight of the copolymer, or from about 45 percent by weight to about 90 percent by weight, based on the weight of the copolymer.

The copolymer toner additive also includes second monomer, wherein the second monomer comprises a crosslinking monomer, in embodiments, the second monomer comprises a crosslinking monomer possessing vinyl groups, in certain embodiments, two or more vinyl groups.

Suitable monomers having vinyl groups for use as the crosslinking vinyl containing monomer include, for example, diethyleneglycol diacrylate, triethyleneglycol diacrylate, tetraethyleneglycol diacrylate, polyethyleneglycol diacrylate, 1,6-hexanediol diacrylate, neopentylglycol diacrylate, tripropyleneglycol diacrylate, polypropyleneglycol diacrylate, 2,2'-bis(4-(acryloxy/diethoxy)phenyl)propane, trimethylolpropane triacrylate, tetramethylolmethane tetraacrylate, ethyleneglycol dimethacrylate, diethyleneglycol dimethacrylate, triethyleneglycol dimethacrylate, tetraethyleneglycol dimethacrylate, polyethyleneglycol dimethacrylate, 1,3-butyleneglycol dimethacrylate, 1,6-hexanediol dimethacrylate, neopentylglycol dimethacrylate, polypropyleneglycol dimethacrylate, 2,2'-bis(4-(methacryloxy/diethoxy)phenyl)propane, 2,2'-bis(4-(methacryloxy/polyethoxy)phenyl)propane, trimethylolpropane trimethacrylate, tetramethylolmethane tetramethacrylate, divinyl benzene, divinyl naphthalene, divinyl ether, combinations thereof, and the like. In a specific embodiment, the cross-linking monomer is divinyl benzene.

The copolymer toner additive herein comprises a second monomer which results in the copolymer toner additive being a highly crosslinked copolymer. In embodiments, the second monomer comprising two or more vinyl groups is present in the copolymer in an amount of greater than about 8 percent by weight to about 60 percent by weight, based upon the weight of the copolymer, or greater than about 10 percent by weight to about 60 percent by weight, based upon the weight of the copolymer, or greater than about 20 percent by weight to about 60 percent by weight, based upon the weight of the copolymer, or greater than about 30 percent by weight to about 60 percent by weight, based upon the weight of the copolymer. In certain embodiments, the second monomer is present in the copolymer in an amount of greater than about 40 percent by weight to about 60 percent by weight, or greater than about 45 percent by weight to about 60 percent by weight, based on the weight of the copolymer.

The copolymer herein optionally further comprises a third monomer comprising an amine functionality. Monomers possessing an amine functionality may be derived from acrylates, methacrylates, combinations thereof, and the like. In embodiments, suitable amine-functional monomers include dimethylaminoethyl methacrylate (DMAEMA), diethylaminoethyl methacrylate, dipropylaminoethyl methacrylate, diisopropylaminoethyl methacrylate, dibutylaminoethyl methacrylate, combinations thereof, and the like.

In embodiments, the copolymer herein does not contain the third monomer. In other embodiments, the copolymer herein contains the third monomer comprising an amine-functional monomer. The amine-functional monomer, if present, may be present in the a copolymer in an amount of from about 0.1 percent by weight of the copolymer to about 40 percent by weight of the copolymer, or from about 0.5 percent by weight of the copolymer to about 5 percent by weight of the copolymer, or from about 0.5 percent by weight of the copolymer to about 1.5 percent by weight of the copolymer. In embodiments, the third monomer is present in an amount of from about 0.1 to about 1.5 percent by weight, based on the weight of the copolymer.

In embodiments, the copolymer additive comprises cyclohexyl methacrylate as a hydrophobic monomer and divinyl benzene as a crosslinkable monomer. In certain embodiments, the copolymer additive comprises cyclohexyl methacrylate as a hydrophobic monomer, divinyl benzene as a cross-linkable monomer, and dimethylaminoethyl methacrylate as a nitrogen-containing monomer.

Methods for forming the copolymer toner surface additive are within the purview of those skilled in the art and include, in embodiments, emulsion polymerization of the monomers utilized to form the polymeric additive.

In the polymerization process, the reactants may be added to a suitable reactor, such as a mixing vessel. The appropriate amount of starting materials may be optionally dissolved in a solvent, an optional initiator may be added to the solution, and contacted with at least one surfactant to form an emulsion. A copolymer may be formed in the emulsion (latex), which may then be recovered and used as the polymeric additive for a toner composition.

Where utilized, suitable solvents include, but are not limited to, water and/or organic solvents including toluene, benzene, xylene, tetrahydrofuran, acetone, acetonitrile, carbon tetrachloride, chlorobenzene, cyclohexane, diethyl ether, dimethyl ether, dimethyl formamide, heptane, hexane, methylene chloride, pentane, combinations thereof, and the like.

In embodiments, the latex for forming the polymeric additive may be prepared in an aqueous phase containing a surfactant or co-surfactant, optionally under an inert gas such as nitrogen.

The surfactant selected for the present co-polymer toner surface additive is a surfactant having a selected surface tension which enables preparation of a smaller sized particle, in embodiments, wherein the polymeric composition comprises latex particles of the copolymer and the surfactant wherein the latex particles have a volume average particle diameter of less than 70 nanometers.

In embodiments, the co-polymer toner surface additive herein has a particle size of less than 70 nanometers, or less than 50 nanometers, or from about 20 to less than 70 nanometers, or from about 20 to about 50 nanometers, or from about 20 to less than 50 nanometers, d50 diameter by volume, measured using a Nanotrac NPA252 from Microtrac, Inc.

In embodiments, a polymeric composition herein comprises latex particles of the copolymer and the surfactant, wherein the latex particles have a volume average particle diameter of from about 20 nanometers to less than 70 nanometers, or from about 20 nanometers to about 50 nanometers, or from about 20 nanometers to less than 50 nanometers.

The surfactant used herein has a minimum surface tension at critical micelle concentration of less than about 30 millinewtons per meter (mN/m). In embodiments, the surfactant selected has a minimum surface tension at critical micelle concentration of from about 10 to less than 30 mN/m, or from about 15 to less than 30 mN/m, or from about 15 to about 25 mN/m, or from about 15 to about 21 mN/m. In embodiments, the surfactant has a minimum surface tension at critical micelle concentration of less than 30 mN/m, or about 20 to about 25 mN/m.

In embodiments, the surfactant has a minimum surface tension at critical micelle concentration of from about 15 to about 25 mN/m; or where the critical micelle concentration cannot be reached, the surfactant has a minimum surface tension of from about 15 to less than about 30 mN/m.

In embodiments, the surfactant selected herein has a minimum surface tension at the critical micelle concentration that is lower than the minimum surface tension of sodium lauryl sulphate at its critical micelle concentration. Thus, in embodiments, the surfactant selected herein has a minimum surface tension at critical micelle concentration; sodium lauryl sulphate has a minimum surface tension at its critical micelle concentration; and the minimum surface tension at critical micelle concentration of the surfactant is lower than the minimum surface tension at critical micelle concentration of sodium lauryl sulphate.

Surface tension of the surfactant can be measured by any suitable or desired method as known in the art. For example, surfactant surface tension can be measured by force tensiometry based on measuring the forces exerted on a probe that is positioned at the liquid-gas interface, as discussed in more detail in the Attension® White Paper and references included therein, entitled "Surface and interfacial tension, —what is it and how to measure it," by Susanna Laurén, Biolin Scientific. Two probe configurations are commonly used, the du Noüy ring and the Wilhelmy plate. A metal (such as platinum) rod can also be used instead of a Wilhelmy plate when sample volume is limited. Surface tension can also be measured optically, this is called optical tensiometry and is based on the analysis of a pendant drop shape.

As known in the art, critical micelle concentration (CMC) is defined as the concentration of surfactants above which micelles form and all additional surfactants added to the system go to micelles.

As known in the art, a micelle is an aggregate (or supramolecular assembly) of surfactant molecules dispersed in a liquid colloid. A typical micelle in aqueous solution forms an aggregate with the hydrophilic "head" regions in contact with surrounding solvent, sequestering the hydrophobic single-tail regions in the micelle center.

The surfactant selected can be any suitable or desired surfactant providing the desired characteristic of achieving the smaller sized co-polymer toner surface additive. In embodiments, the surfactant is selected from the group consisting of dodecylbenzene sulfonates, trisiloxanes such as $((CH_3)_3SiO_2)_2Si—(CH_3)(CH_2)_3(OCH_2CH_2)nOH$ with n=4-12, that have a surface tension at the critical micelle concentration of 20-21 mN/m, oxyethylated alcohols, $C_{14}EO_8$, $C_{12}EO_5$ and $C_{10}EO_4$, dimethyldidodecyl-ammonium bromide (DDAB); perfluorocarboxylic acids and salts thereof, $C_6F_{13}COOLi$, $C_7F_{15}COOH$, $C_7F_{15}COONa$, $C_8F_{17}COOH$, $C_8F_{17}COOLi$, $C_8F_{17}COONa$, $C_8F_{17}COONH_4$, $C_8F_{17}COONH_3C_2H_4OH$, $C_{10}F_{21}COOLi$, $C_{10}F_{21}COONH_4$, $C_{10}F_{21}COONH_3C_2H_4OH$, $C_{12}F_{25}COOLi$, salts of perfluoroalkanesulfonic acid, $C_8F_{17}SO_3Li$, $C_8F_{17}SO_3Na$, $C_8F_{17}SO_3NH_4$, $C_8F_{17}SO_3NH_3C_2H_4OH$, other specific fluorosurfactants include Novec™ FC-4430, FC-4432, FC-4434 non-ionic, polymeric surfactants from 3M™, FC-5120 anionic ammonium fluoroalkylsulfonate, specifically nonafluorobutyl[sulfonyl]amino-2-hydroxy-1-propanesulfonic acid, ammonia salt, from 3M™, Zonyl® FSN-100, Zonyl® FS-300, non-ionic ethoxylates from DuPont™, Zonyl® FS-500 an amphoteric betaine from DuPont™, Capstone™ FS-10 perfluoroalkylsulfonic acid from DuPont™, Capstone™ FS-30 non-ionic ethoxylate from DuPont™, Capstone™ FS-60 anionic blend from DuPont™, Capstone™ FS-61 anionic phosphate from DuPont™, Capstone™ FS-63 anionic phosphate from DuPont™, Capstone™ FS-64 anionic phosphate DuPont™, Capstone® FS-65 non-ionic from DuPont™. Highly branched hydrocarbon surfactants, including isostearyl sulphate Na salt, isostearyl sulphate tetrapropylammonium salt, and $(CH_3)_3CCH_2CH(CH_3)CH_2PO_4Na$ may also be selected. In embodiments, with an appropriate choice of counterion, the surface tension can be reduced to less than 30 mN/m at the critical micelle concentration, such as for dioctyl ammonium sulfosuccinate, dioctyl triethylamine sulfosuccinate, dioctyl trimethylamine sulfosuccinate, and dioctyl tetrapropylammonium sulfosuccinate. See, S. Alexander et al, Langmuir 2014, 30:3413-3421. To address environmental concerns of fluorosurfactants regarding potential issues around bioaccumulation and environmental impact, 3M has created a nonafluorobutanesulphonyl fluoride intermediate that is converted into fluorosurfactants through a sulphonamide process. These new materials have a perfluoroalkyl group with n≤4 and are not of as much concern from a regulatory perspective as are fluorochemicals with n>4. Previously commercialized under the Fluorad™ trademark, they are now replaced by Novec™, with surface tensions of 15-21 mN/m at a concentration of 10-5 to 10-3 mol/L in pH 8 buffered aqueous solutions. See, Farn, R. J. (Ed.), (2006), Chemistry and Technology of Surfactants, Blackwell Publishing Ltd.

In embodiments, the surfactant is a dodecylbenzene sulfonate. In other embodiments, the surfactant is sodium dodecylbenzene sulfonate.

In certain embodiments, the surfactant is selected from the group consisting of $((CH_3)_3SiO_2)_2Si—(CH_3)(CH_2)_3(OCH_2CH_2)_nOH$ wherein n is from about 4 to about 12, oxyethylated alcohols, dimethyldidodecyl-ammonium bromide, perfluorocarboxylic acids and salts thereof, perfluoroalkanesulfonic acid salts, isostearyl sulphate salts, $(CH_3)_3CCH_2CH(CH_3)CH_2PO_4Na$, dioctyl ammonium sulfosuccinate, dioctyl triethylamine sulfosuccinate, dioctyl trimethylamine sulfosuccinate, dioctyl tetrapropylammonium sulfosuccinate, and combinations thereof.

In embodiments, the surfactants which may be utilized to form the latex dispersion can be used in an amount of from about 0.1 to about 15 weight percent of all of the ingredients of the latex, including the monomers, water, initiator and surfactant, and in embodiments of from about 0.2 to about 5 weight percent of all of the ingredients of the latex, the monomers, water, initiator and surfactant, and in embodiments from about 0.3 to about 2 weight percent of all of the ingredients of the latex, the monomers, water, initiator and surfactant.

Thus, in embodiments, the polymeric composition herein comprises a latex including latex particles of the copolymer and the surfactant, and water; wherein the copolymer comprises the monomers described herein; wherein the latex further comprises an initiator; and wherein the surfactant is present in an amount of from about 0.3 to about 2 percent by weight, based upon the weight of all ingredients in the latex, including the monomers, the water, the initiator, and the surfactant.

In certain embodiments, a polymeric composition herein comprises a latex including latex particles of the copolymer and the surfactant and water, wherein the surfactant is present in an amount of from about 0.1 to about 15, or from about 0.2 to about 5, or from about 0.3 to about 2 percent by weight, based upon the weight of all the latex ingredients, including the resin, the water, the surfactant, and the initiator. In embodiments, the surfactant is present in an amount of from about 0.3 to about 2 percent by weight, based upon the weight of all the ingredients in the latex, including the monomers, the water, the surfactant, and the initiator.

In embodiments initiators may be added for formation of the latex utilized in formation of the polymeric additive. Examples of suitable initiators include water soluble initiators, such as ammonium persulfate, sodium persulfate and potassium persulfate, and organic soluble initiators including organic peroxides and azo compounds including Vazo peroxides, such as VAZO64™, 2-methyl 2-2-azobis propanenitrile, VAZO88™, 2-2'-azobis isobutyramide dehydrate, and combinations thereof. Other water-soluble initiators which may be utilized include azoamidine compounds, for example 2,2'-azobis(2-methyl-N-phenylpropionamidine)dihydrochloride, 2,2'-azobis[N-(4-chlorophenyl)-2-methylpropionamidine]di-hydrochloride, 2,2'-azobis[N-(4-hydroxyphenyl)-2-methyl-propionamidine]dihydrochloride, 2,2'-azobis[N-(4-amino-phenyl)-2-methylpropionamidine] tetrahydrochloride, 2,2'-azobis[2-methyl-N(phenylmethyl) propionamidine]dihydrochloride, 2,2'-azobis[2-methyl-N-2-propenylpropionamidinedihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2-azobis[2-(3,4,5,6-tetrahydropyrimidin-2-yl)propane]dihydrochloride, 2,2'-azobis[2-(5-hydroxy-3,4,5,6-tetrahydropyrimidin-2-yl) propane]dihydrochloride, 2,2'-azobis{2-[1-(2-hydroxyethyl)-2-imidazolin-2-yl]propane}dihydrochloride, combinations thereof, and the like.

Initiators can be added in suitable amounts, such as from about 0.1 to about 8 weight percent, or from about 0.2 to about 5 weight percent, of the monomers.

In forming the emulsions, the starting materials, surfactant, optional solvent, and optional initiator may be combined utilizing any means within the purview of those skilled in the art. In embodiments, the reaction mixture may be mixed for from about 1 minute to about 72 hours, in embodiments from about 4 hours to about 24 hours, while keeping the temperature at from about 10° C. to about 100° C., or from about 20° C. to about 90° C., or from about 45° C. to about 75° C.

Those skilled in the art will recognize that optimization of reaction conditions, temperature, and initiator loading can be varied to generate polymers of various molecular weights, and that structurally related starting materials may be polymerized using comparable techniques.

The resulting latex, possessing the polymeric additive of the present disclosure, may have a C/O ratio of from about 3 to about 8, in embodiments from about 4 to about 7.

The resulting latex, possessing the polymeric additive of the present disclosure, may be applied to toner particles utilizing any means within the purview of one skilled in the art. In embodiments, the toner particles may be dipped in or sprayed with the latex including the polymeric additive, thus becoming coated therewith, and the coated particles may then be dried to leave the polymeric coating thereon.

In other embodiments, once the copolymer utilized as the additive for a toner has been formed, it may be recovered from the latex by any technique within the purview of those skilled in the art, including filtration, drying, centrifugation, spray drying, combinations thereof, and the like.

In embodiments, once obtained, the copolymer utilized as the additive for a toner may be dried to powder form by any method within the purview of those skilled in the art, including, for example, freeze drying, optionally in a vacuum, spray drying, combinations thereof, and the like. The dried polymeric additive of the present disclosure may then be applied to toner particles utilizing any means within the purview of those skilled in the art including, but not limited to, mechanical impaction and/or electrostatic attraction.

The copolymer toner additive herein is a smaller size than previous organic toner additives. In embodiments, the copolymer toner additive has an average or median volume average particle diameter (d50) of less than 70 nanometers. In embodiments, the copolymer toner additive has an average or median particle size (d50) of from about 20 nanometers to less than 70 nanometers, or from about 20 nanometers to about 65 nanometers, or from about 20 to about 60 nanometers, or from about 20 to about 50 nanometers. In specific embodiments, the copolymer toner additive herein has an average or median particle size (d50) of less than 50 nanometers, such as from about 20 to less than 50 nanometers.

In embodiments, a toner herein includes toner particles comprising at least one resin, in combination with an optional colorant, and an optional wax; and a copolymer toner surface additive on at least a portion of an external surface of the toner particles, the copolymer toner surface additive comprising a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; and optionally, a third monomer comprising an amine, wherein the third monomer, if present, is present in an amount of from about 0.5 percent by weight to about 1.5 percent by weight, based on the weight of the copolymer; and a surfactant, wherein the surfactant has a minimum surface tension at critical micelle concentration of less than about 30 mN/m; wherein the copolymer toner additive has a volume average particle diameter of from about 20 nanometers to less than 70 nanometers.

The smaller sized copolymer toner additive may be present in the toner in any suitable or desired amount, in embodiments, in an amount of from about 0.1 parts per hundred by weight to about 2 parts per hundred by weight, or from about 0.2 parts per hundred by weight to about 1.4 parts per hundred by weight, or from about 0.3 parts per hundred by weight to about 1 part per hundred by weight, based on 100 parts by weight of base toner particles. As used herein base toner particles means the toner particle as formed that includes the toner particle resin, including optionally any internal components mixed in with the resin, including but not limited to pigment, wax, and internal charge control agents (CCA), and not including any surface added components that are added after the toner particle is formed. In embodiments, the copolymer toner surface additive having a volume average particle diameter of from about 20 nanometers to less than 70 nanometers is present in an amount of from about 0.1 parts per hundred to about 2 parts per hundred by weight, based on 100 parts by weight of base toner particles. In embodiments, the copolymer toner surface additive has a volume average particle diameter of about 20 nanometers to less than 50 nanometers and is present in the toner in an amount of from about 0.1 part per hundred to about 2 parts per hundred by weight based on 100 parts by weight of base toner particles.

In embodiments, the toner may further include a second larger copolymer toner additive comprising an organic cross-linked surface additive having a particle size or particle diameter of from about 70 nanometers to about 250 nanometers in diameter. These larger particles of copolymer surface additive may have an average or median particle size or particle diameter (d50) of from about 70 nanometers to about 250 nanometers in diameter, or from about 80 nanometers to about 200 nanometers in diameter, or from about 80 to about 115 nanometers.

If the second, larger size copolymer toner additive comprising an organic cross-linked surface additive is present, it can be present in an amount of from about 0.1 parts per hundred by weight to about 5 parts per hundred by weight, or from about 0.2 parts per hundred by weight to about 0.4 parts per hundred by weight, or from about 0.5 parts per hundred by weight to about 1.5 parts per hundred by weight, based on 100 parts by weight of base toner particles.

Advantageously, the teachings of the present disclosure render it easier to arrive at the desired particle size, in embodiments, a copolymer size as described herein.

The copolymers utilized as the polymeric additive, in embodiments, are not soluble in solvents such as tetrahydrofuran (THF) due to their highly cross-linked nature. Thus, it is not possible to measure a number average molecular weight (Mn) or a weight average molecular weight (Mw), as measured by gel permeation chromatography (GPC.

The copolymers utilized as the polymeric additive may have a glass transition temperature (Tg) of from about 85° C. to about 140° C., in embodiments from about 100° C. to about 130° C. In embodiments, A-zone charge of a toner including the polymeric additive of the present disclosure may be from about −15 to about −80 microcoulombs per gram, in embodiments from about −20 to about −60 microcoulombs per gram, while A-zone charge of a toner including the polymeric additive of the present disclosure may be from about −15 to about −80 microcoulombs per gram, in embodiments from about −20 to about −60 microcoulombs per gram.

The polymeric surface additive composition of the present disclosure may be combined with toner particles so that the polymeric surface additive composition is present in an amount of from about 0.1 percent to about 2 percent by weight, or from about 0.2 percent to about 1.44 percent by weight, or from about 0.3 percent to about 1 percent by weight, based upon the weight of the toner particles. In certain embodiments, the copolymer toner surface additive having a volume average particle diameter of from about 20 nanometers to less than 70 nanometers is present in an amount of from about 0.1 parts per hundred to about 2 parts per hundred by weight, based on 100 parts by weight of base toner particles. In embodiments, the polymeric composition may cover from about 5 percent to about 100 percent, or from about 10 percent to about 100 percent, or from about 20 percent to about 50 percent of the surface area of the toner particles.

The polymeric additives thus produced may be combined with toner resins, optionally possessing colorants, to form a toner of the present disclosure.

Any toner resin may be utilized in forming a toner of the present disclosure. Such resins, in turn, may be made of any suitable monomer or monomers via any suitable polymerization method. In embodiments, the resin may be prepared by a method other than emulsion polymerization. In further embodiments, the resin may be prepared by condensation polymerization.

The toner composition of the present disclosure, in embodiments, includes an amorphous resin. The amorphous resin may be linear or branched. In embodiments, the amorphous resin may include at least one low molecular weight amorphous polyester resin. The low molecular weight amorphous polyester resins, which are available from a number of sources, can possess various melting points of, for example, from about 30° C. to about 120° C., in embodiments from about 75° C. to about 115° C., in embodiments from about 100° C. to about 110° C., or in embodiments from about 104° C. to about 108° C. As used herein, the low molecular weight amorphous polyester resin has, for example, a number average molecular weight (Mn), as measured by gel permeation chromatography (GPC) of, for example, from about 1,000 to about 10,000, in embodiments from about 2,000 to about 8,000, in embodiments from about 3,000 to about 7,000, and in embodiments from about 4,000 to about 6,000. The weight average molecular weight (Mw) of the resin is 50,000 or less, for example, in embodiments from about 2,000 to about 50,000, in embodiments from about 3,000 to about 40,000, in embodiments from about 10,000 to about 30,000, and in embodiments from about 18,000 to about 21,000, as determined by GPC using polystyrene standards. The molecular weight distribution (Mw/Mn) of the low molecular weight amorphous resin is, for example, from about 2 to about 6, in embodiments from about 3 to about 4. The low molecular weight amorphous polyester resins may have an acid value of from about 8 to about 20 mg KOH/g, in embodiments from about 9 to about 16 mg KOH/g, and in embodiments from about 10 to about 14 mg KOH/g.

Examples of linear amorphous polyester resins which may be utilized include poly(propoxylated bisphenol A co-fumarate), poly(ethoxylated bisphenol A co-fumarate), poly(butyloxylated bisphenol A co-fumarate), poly(co-propoxylated bisphenol A co-ethoxylated bisphenol A co-fumarate), poly(1,2-propylene fumarate), poly(propoxylated bisphenol A co-maleate), poly(ethoxylated bisphenol A co-maleate), poly(butyloxylated bisphenol A co-maleate), poly(co-propoxylated bisphenol A co-ethoxylated bisphenol A co-maleate), poly(1,2-propylene maleate), poly(propoxylated bisphenol A co-itaconate), poly(ethoxylated bisphenol A co-itaconate), poly(butyloxylated bisphenol A co-itaconate), poly(co-propoxylated bisphenol A co-ethoxylated bisphenol A co-itaconate), poly(1,2-propylene itaconate), and combinations thereof.

In embodiments, a suitable amorphous resin may include alkoxylated bisphenol A fumarate/terephthalate based polyesters and copolyester resins. In embodiments, a suitable amorphous polyester resin may be a copoly(propoxylated bisphenol A co-fumarate)-copoly(propoxylated bisphenol A co-terephthalate) resin having the following formula (I):

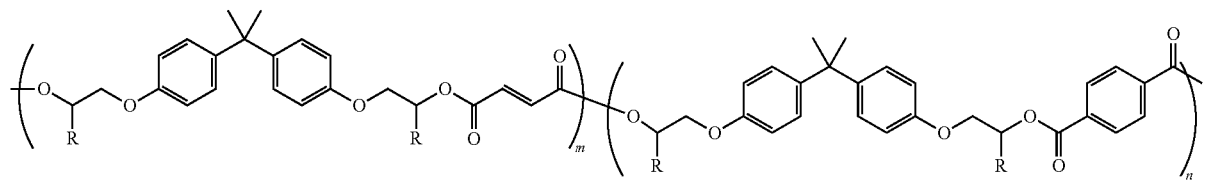

(I)

wherein R may be hydrogen or a methyl group, m and n represent random units of the copolymer, m may be from about 2 to 10, and n may be from about 2 to 10. Examples of such resins and processes for their production include those disclosed in U.S. Pat. No. 6,063,827, the disclosure of which is hereby incorporated by reference herein in its entirety.

An example of a linear propoxylated bisphenol A fumarate resin which may be utilized as a latex resin is available under the trade name SPARII™ from Resana S/A Industrias Quimicas, Sao Paulo Brazil. Other suitable linear resins include those disclosed in U.S. Pat. Nos. 4,533,614, 4,957,774, and 4,533,614, each of which is incorporated by reference herein in its entirety, which can be linear polyester resins including terephthalic acid, dodecylsuccinic acid, trimellitic acid, fumaric acid and alkyloxylated bisphenol A, such as, for example, bisphenol-A ethylene oxide adducts and bisphenol-A propylene oxide adducts. Other propoxylated bisphenol A terephthalate resins that may be utilized and are commercially available include GTU-FC115, commercially available from Kao Corporation, Japan, and the like.

In embodiments, the low molecular weight amorphous polyester resin may be a saturated or unsaturated amorphous polyester resin. Illustrative examples of saturated and unsaturated amorphous polyester resins selected for the process and particles of the present disclosure include any of the various amorphous polyesters, such as polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-isophthalate, polypropylene-isophthalate, polybutylene-isophthalate, polypentylene-isophthalate, polyhexalene-isophthalate, polyheptadene-isophthalate, polyoctalene-isophthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly(ethoxylated bisphenol A-fumarate), poly(ethoxylated bisphenol A-succinate), poly(ethoxylated bisphenol A-adipate), poly(ethoxylated bisphenol A-glutarate), poly(ethoxylated bisphenol A-terephthalate), poly(ethoxylated bisphenol A-isophthalate), poly(ethoxylated bisphenol A-dodecenylsuccinate), poly(propoxylated bisphenol A-fumarate), poly(propoxylated bisphenol A-succinate), poly(propoxylated bisphenol A-adipate), poly(propoxylated bisphenol A-glutarate), poly(propoxylated bisphenol A-terephthalate), poly(propoxylated bisphenol A-isophthalate), poly(propoxylated bisphenol A-dodecenylsuccinate), SPAR (Dixie Chemicals), BECKOSOL® (Reichhold Inc.), ARAKOTE (Ciba-Geigy Corporation), HETRON™ (Ashland Chemical), PARAPLEX® (Rohm & Haas), POLYLITE® (Reichhold Inc.), PLASTHALL® (Rohm & Haas), CELANEX® (Celanese Corporation), RYNITE® (DuPont™), STYPOL® (Polynt Composites, Inc.), and combinations thereof. The resins can also be functionalized, such as carboxylated, sulfonated, or the like, and particularly such as sodio sulfonated, if desired.

The low molecular weight linear amorphous polyester resins are generally prepared by the polycondensation of an organic diol, a diacid or diester, and a polycondensation catalyst. The low molecular weight amorphous resin is generally present in the toner composition in various suitable amounts, such as from about 60 to about 90 weight percent, in embodiments from about 50 to about 65 weight percent, of the toner or of the solids.

Examples of organic diols selected for the preparation of low molecular weight resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of diacid or diesters selected for the preparation of the low molecular weight amorphous polyester include dicarboxylic acids or diesters such as terephthalic acid, phthalic acid, isophthalic acid, fumaric acid, maleic acid, itaconic acid, succinic acid, succinic anhydride, dodecylsuccinic acid, dodecylsuccinic anhydride, dodecenylsuccinic acid, dodecenylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, dimethyl dodecenylsuccinate, and mixtures thereof. The organic diacid or diester is selected, for example, in an amount of from about 45 to about 52 mole percent of the resin.

Examples of suitable polycondensation catalysts for either the low molecular weight amorphous polyester resin or the crystalline resin (described below) include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts may be utilized in amounts of, for example, from about 0.01 mole percent to about 5 mole percent based on the starting diacid or diester used to generate the polyester resin.

The low molecular weight amorphous polyester resin may be a branched resin. As used herein, the terms "branched" or "branching" includes branched resin and/or cross-linked resins. Branching agents for use in forming these branched resins include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

The resulting unsaturated polyesters are reactive (for example, crosslinkable) on two fronts: (i) unsaturation sites (double bonds) along the polyester chain, and (ii) functional groups such as carboxyl, hydroxy, and the like, groups amenable to acid-base reactions. In embodiments, unsaturated polyester resins are prepared by melt polycondensation or other polymerization processes using diacids and/or anhydrides and diols.

In embodiments, the low molecular weight amorphous polyester resin or a combination of low molecular weight amorphous resins may have a glass transition temperature of from about 30° C. to about 80° C., in embodiments from about 35° C. to about 70° C. In further embodiments, the combined amorphous resins may have a melt viscosity of from about 10 to about 1,000,000 Pa*S at about 130° C., in embodiments from about 50 to about 100,000 Pa*S.

The amount of the low molecular weight amorphous polyester resin in a toner particle of the present disclosure, whether in any core, any shell, or both, may be present in an amount of from 25 to about 50 percent by weight, in embodiments from about 30 to about 45 percent by weight, and in embodiments from about 35 to about 43 percent by weight, of the toner particles (that is, toner particles exclusive of external additives and water).

In embodiments, the toner composition includes at least one crystalline resin. As used herein, "crystalline" refers to a polyester with a three dimensional order. "Semicrystalline resins" as used herein refers to resins with a crystalline percentage of, for example, from about 10 to about 90%, in embodiments from about 12 to about 70%. Further, as used hereinafter, "crystalline polyester resins" and "crystalline resins" encompass both crystalline resins and semicrystalline resins, unless otherwise specified.

In embodiments, the crystalline polyester resin is a saturated crystalline polyester resin or an unsaturated crystalline polyester resin.

The crystalline polyester resins, which are available from a number of sources, may possess various melting points of, for example, from about 30° C. to about 120° C., in embodiments from about 50° C. to about 90° C. The crystalline resins may have, for example, a number average molecular weight (Mn), as measured by gel permeation chromatography (GPC) of, for example, from about 1,000 to about 50,000, in embodiments from about 2,000 to about 25,000, in embodiments from about 3,000 to about 15,000, and in embodiments from about 6,000 to about 12,000. The weight average molecular weight (Mw) of the resin is 50,000 or less, for example, from about 2,000 to about 50,000, in embodiments from about 3,000 to about 40,000, in embodiments from about 10,000 to about 30,000, and in embodiments from about 21,000 to about 24,000, as determined by GPC using polystyrene standards. The molecular weight distribution (Mw/Mn) of the crystalline resin is, for example, from about 2 to about 6, in embodiments from about 3 to about 4. The crystalline polyester resins may have an acid value of about 2 to about 20 mg KOH/g, in embodiments from about 5 to about 15 mg KOH/g, and in embodiments from about 8 to about 13 mg KOH/g.

Illustrative examples of crystalline polyester resins may include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(dodecylene-sebacate), poly(ethylene-dodecanedioate), poly(propylene-dodecanedioate), poly(butylene-dodecanedioate), poly(pentylene-dodecanedioate), poly(hexylene-dodecanedioate), poly(octylene-dodecanedioate), poly(nonylene-dodecanedioate), poly(decylene-dodecandioate), poly(undecylene-dodecandioate), poly(dodecylene-dodecandioate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfo-isophthaloyl)-copoly(ethylene-sebacate), copoly(5-sulfo-isophthaloyl)-copoly(propylene-sebacate), copoly(5-sulfo-isophthaloyl)-copoly(butylene-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and combinations thereof.

The crystalline resin may be prepared by a polycondensation process by reacting suitable organic diol(s) and suitable organic diacid(s) in the presence of a polycondensation catalyst. Generally, a stoichiometric equimolar ratio of organic diol and organic diacid is utilized, however, in some instances, wherein the boiling point of the organic diol is from about 180° C. to about 230° C., an excess amount of diol can be utilized and removed during the polycondensation process. The amount of catalyst utilized varies, and may be selected in an amount, for example, of from about 0.01 to about 1 mole percent of the resin. Additionally, in place of the organic diacid, an organic diester can also be selected, and where an alcohol byproduct is generated. In further embodiments, the crystalline polyester resin is a poly(dodecandioic acid-co-nonanediol).

Examples of organic diols selected for the preparation of crystalline polyester resins include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixtures thereof, and the like. The aliphatic diol is, for example, selected in an amount of from about 45 to about 50 mole percent of the resin, and the alkali sulfo-aliphatic diol can be selected in an amount of from about 1 to about 10 mole percent of the resin.

Examples of organic diacids or diesters selected for the preparation of the crystalline polyester resins include oxalic acid, succinic acid, glutaric acid, adipic acid, suberic acid, azelaic acid, sebacic acid, phthalic acid, isophthalic acid, terephthalic acid, napthalene-2,6-dicarboxylic acid, naphthalene-2,7-dicarboxylic acid, cyclohexane dicarboxylic acid, malonic acid and mesaconic acid, a diester or anhydride thereof; and an alkali sulfo-organic diacid such as the sodio, lithio or potassium salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfo-p-hydroxybenzoic acid, N,N-bis(2-hydroxyethyl)-2-amino ethane sulfonate, or mixtures thereof. The organic diacid is selected in an amount of, for example, from about 40 to about 50 mole percent of the resin, and the alkali sulfoaliphatic diacid can be selected in an amount of from about 1 to about 10 mole percent of the resin.

Suitable crystalline polyester resins include those disclosed in U.S. Pat. No. 7,329,476 and U.S. Patent Application Pub. Nos. 2006/0216626, 2008/0107990, 2008/0236446 and 2009/0047593, each of which is hereby incorporated by reference herein in their entirety. In embodiments, a suitable crystalline resin may include a resin composed of ethylene glycol or nonanediol and a mixture of dodecanedioic acid and fumaric acid co-monomers with the following formula (II):

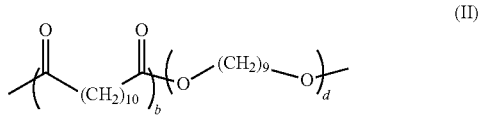

(II)

wherein b is from about 5 to about 2000, and d is from about 5 to about 2000.

If semicrystalline polyester resins are employed herein, the semicrystalline resin may include poly(3-methyl-1-butene), poly(hexamethylene carbonate), poly(ethylene-p-carboxy phenoxy-butyrate), poly(ethylene-vinyl acetate), poly(docosyl acrylate), poly(dodecyl acrylate), poly(octadecyl acrylate), poly(octadecyl methacrylate), poly(behenylpolyethoxyethyl methacrylate), poly(ethylene adipate), poly(decamethylene adipate), poly(decamethylene azelate), poly(hexamethylene oxalate), poly(decamethylene oxalate), poly(ethylene oxide), poly(propylene oxide), poly(butadiene oxide), poly(decamethylene oxide), poly(decamethylene sulfide), poly(decamethylene disulfide), poly(ethylene sebacate), poly(decamethylene sebacate), poly(ethylene suberate), poly(decamethylene succinate), poly(eicosamethylene malonate), poly(ethylene-p-carboxy phenoxy-undecanoate), poly(ethylene dithionesophthalate), poly(methyl ethylene terephthalate), poly(ethylene-p-carboxy phenoxy-valerate), poly(hexamethylene-4,4-oxydibenzoate), poly(10-hydroxy capric acid), poly(isophthalaldehyde), poly(octamethylene dodecanedioate), poly(dimethyl siloxane), poly(dipropyl siloxane), poly(tetramethylene phenylene diacetate), poly(tetramethylene trithiodicarboxylate), poly(trimethylene dodecane dioate), poly(m-xylene), poly(p-xylylene pimelamide), and combinations thereof.

The amount of the crystalline polyester resin in a toner particle of the present disclosure, whether in core, shell or both, may be present in an amount of from 1 to about 15 percent by weight, in embodiments from about 5 to about 10 percent by weight, and in embodiments from about 6 to about 8 percent by weight, of the toner particles (that is, toner particles exclusive of external additives and water).

In embodiments, a toner of the present disclosure may also include at least one high molecular weight branched or cross-linked amorphous polyester resin. This high molecular weight resin may include, in embodiments, for example, a branched amorphous resin or amorphous polyester, a cross-linked amorphous resin or amorphous polyester, or mixtures thereof, or a non-cross-linked amorphous polyester resin that has been subjected to cross-linking. In accordance with the present disclosure, from about 1% by weight to about 100% by weight of the high molecular weight amorphous polyester resin may be branched or cross-linked, in embodiments from about 2% by weight to about 50% by weight of the higher molecular weight amorphous polyester resin may be branched or cross-linked.

As used herein, the high molecular weight amorphous polyester resin may have, for example, a number average molecular weight (Mn), as measured by gel permeation chromatography (GPC) of, for example, from about 1,000 to about 10,000, in embodiments from about 2,000 to about 9,000, in embodiments from about 3,000 to about 8,000, and in embodiments from about 6,000 to about 7,000. The weight average molecular weight (Mw) of the resin is greater than 55,000, for example, from about 55,000 to about 150,000, in embodiments from about 60,000 to about 100,000, in embodiments from about 63,000 to about 94,000, and in embodiments from about 68,000 to about 85,000, as determined by GPC using polystyrene standard. The polydispersity index (PD) is above about 4, such as, for example, greater than about 4, in embodiments from about 4 to about 20, in embodiments from about 5 to about 10, and in embodiments from about 6 to about 8, as measured by GPC versus standard polystyrene reference resins. The PD index is the ratio of the weight-average molecular weight (Mw) and the number-average molecular weight (Mn). The low molecular weight amorphous polyester resins may have an acid value of from about 8 to about 20 mg KOH/g, in embodiments from about 9 to about 16 mg KOH/g, and in embodiments from about 11 to about 15 mg KOH/g. The high molecular weight amorphous polyester resins, which are available from a number of sources, can possess various melting points of, for example, from about 30° C. to about 140° C., in embodiments from about 75° C. to about 130° C., in embodiments from about 100° C. to about 125° C., and in embodiments from about 115° C. to about 121° C.

The high molecular weight amorphous resins, which are available from a number of sources, can possess various onset glass transition temperatures (Tg) of, for example, from about 40° C. to about 80° C., in embodiments from about 50° C. to about 70° C., and in embodiments from about 54° C. to about 68° C., as measured by differential scanning calorimetry (DSC). The linear and branched amorphous polyester resins, in embodiments, may be a saturated or unsaturated resin.

The high molecular weight amorphous polyester resins may be prepared by branching or cross-linking linear polyester resins. Branching agents can be utilized, such as trifunctional or multifunctional monomers, which agents usually increase the molecular weight and polydispersity of the polyester. Suitable branching agents include glycerol, trimethylol ethane, trimethylol propane, pentaerythritol, sorbitol, diglycerol, trimellitic acid, trimellitic anhydride, pyromellitic acid, pyromellitic anhydride, 1,2,4-cyclohexanetricarboxylic acid, 2,5,7-naphthalenetricarboxylic acid, 1,2,4-butanetricarboxylic acid, combinations thereof, and the like. These branching agents can be utilized in effective amounts of from about 0.1 mole percent to about 20 mole percent based on the starting diacid or diester used to make the resin.

Compositions containing modified polyester resins with a polybasic carboxylic acid which may be utilized in forming high molecular weight polyester resins include those disclosed in U.S. Pat. No. 3,681,106, as well as branched or cross-linked polyesters derived from polyvalent acids or alcohols as illustrated in U.S. Pat. Nos. 4,863,825; 4,863,824; 4,845,006; 5,143,809; 5,057,596; 4,988,794; 4,981,939; 4,980,448; 4,933,252; 4,931,370; 4,917,983, and 4,973,539, the disclosures of each of which are incorporated by reference herein in their entirety.

In embodiments, cross-linked polyesters resins may be made from linear amorphous polyester resins that contain sites of unsaturation that can react under free-radical conditions. Examples of such resins include those disclosed in U.S. Pat. Nos. 5,227,460; 5,376,494; 5,480,756; 5,500,324; 5,601,960; 5,629,121; 5,650,484; 5,750,909; 6,326,119; 6,358,657; 6,359,105; and 6,593,053, the disclosures of each of which are incorporated by reference herein in their entirety. In embodiments, suitable unsaturated polyester base resins may be prepared from diacids and/or anhydrides such as, for example, maleic anhydride, terephthalic acid, trimellitic acid, fumaric acid, and the like, and combinations thereof, and diols such as, for example, bisphenol-A ethyleneoxide adducts, bisphenol A-propylene oxide adducts, and the like, and combinations thereof. In embodiments, a suitable polyester is poly(propoxylated bisphenol A co-fumaric acid).

In embodiments, a cross-linked branched polyester may be utilized as a high molecular weight amorphous polyester resin. Such polyester resins may be formed from at least two pre-gel compositions including at least one polyol having two or more hydroxyl groups or esters thereof, at least one aliphatic or aromatic polyfunctional acid or ester thereof, or a mixture thereof having at least three functional groups; and optionally at least one long chain aliphatic carboxylic acid or ester thereof, or aromatic monocarboxylic acid or ester thereof, or mixtures thereof. The two components may be reacted to substantial completion in separate reactors to produce, in a first reactor, a first composition including a pre-gel having carboxyl end groups, and in a second reactor, a second composition including a pre-gel having hydroxyl end groups. The two compositions may then be mixed to create a cross-linked branched polyester high molecular weight resin. Examples of such polyesters and methods for their synthesis include those disclosed in U.S. Pat. No. 6,592,913, the disclosure of which is hereby incorporated by reference herein in its entirety.

Suitable polyols may contain from about 2 to about 100 carbon atoms and have at least two or more hydroxyl groups, or esters thereof. Polyols may include glycerol, pentaerythritol, polyglycol, polyglycerol, and the like, or mixtures thereof. The polyol may include a glycerol. Suitable esters of glycerol include glycerol palmitate, glycerol sebacate, glycerol adipate, triacetin tripropionin, and the like. The polyol may be present in an amount of from about 20% to about 30% by weight of the reaction mixture, in embodiments, from about 22% to about 26% by weight of the reaction mixture.

Aliphatic polyfunctional acids having at least two functional groups may include saturated and unsaturated acids containing from about 2 to about 100 carbon atoms, or esters thereof, in some embodiments, from about 4 to about 20 carbon atoms. Other aliphatic polyfunctional acids include malonic, succinic, tartaric, malic, citric, fumaric, glutaric, adipic, pimelic, sebacic, suberic, azelaic, sebacic, and the like, or mixtures thereof. Other aliphatic polyfunctional acids which may be utilized include dicarboxylic acids containing a $C_3$ to $C_6$ cyclic structure and positional isomers thereof, and include cyclohexane dicarboxylic acid, cyclobutane dicarboxylic acid or cyclopropane dicarboxylic acid.

Aromatic polyfunctional acids having at least two functional groups which may be utilized include terephthalic, isophthalic, trimellitic, pyromellitic and naphthalene 1,4-, 2,3-, and 2,6-dicarboxylic acids.

The aliphatic polyfunctional acid or aromatic polyfunctional acid may be present in an amount of from about 40% to about 65% by weight of the reaction mixture, in embodiments, from about 44% to about 60% by weight of the reaction mixture.

Long chain aliphatic carboxylic acids or aromatic monocarboxylic acids may include those containing from about 12 to about 26 carbon atoms, or esters thereof, in embodiments, from about 14 to about 18 carbon atoms. Long chain aliphatic carboxylic acids may be saturated or unsaturated. Suitable saturated long chain aliphatic carboxylic acids may include lauric, myristic, palmitic, stearic, arachidic, cerotic, and the like, or combinations thereof. Suitable unsaturated long chain aliphatic carboxylic acids may include dodecylenic, palmitoleic, oleic, linoleic, linolenic, erucic, and the like, or combinations thereof. Aromatic monocarboxylic acids may include benzoic, naphthoic, and substituted naphthoic acids. Suitable substituted naphthoic acids may include naphthoic acids substituted with linear or branched alkyl groups containing from about 1 to about 6 carbon atoms such as 1-methyl-2 naphthoic acid and/or 2-isopropyl-1-naphthoic acid. The long chain aliphatic carboxylic acid or aromatic monocarboxylic acids may be present in an amount of from about 0% to about 70% weight of the reaction mixture, in embodiments, of from about 15% to about 30% weight of the reaction mixture.

Additional polyols, ionic species, oligomers, or derivatives thereof, may be used if desired. These additional glycols or polyols may be present in amounts of from about 0% to about 50% weight percent of the reaction mixture. Additional polyols or their derivatives thereof may include propylene glycol, 1,3-butanediol, 1,3-propanediol, 1,4-butanediol, 1,6-hexanediol diethylene glycol, 1,4-cyclohexanediol, 1,4-cyclohexanedimethanol, neopentyl glycol, triacetin, trimethylolpropane, pentaerythritol, cellulose ethers, cellulose esters, such as cellulose acetate, sucrose acetate iso-butyrate and the like.

In embodiments, the cross-linked branched polyesters for the high molecular weight amorphous polyester resin may include those resulting from the reaction of dimethylterephthalate, 1,3-butanediol, 1,2-propanediol, and pentaerythritol.

In embodiments, the high molecular weight resin, for example a branched polyester, may be present on the surface of toner particles of the present disclosure. The high molecular weight resin on the surface of the toner particles may also be particulate in nature, with high molecular weight resin particles having a diameter of from about 100 nanometers to about 300 nanometers, in embodiments from about 110 nanometers to about 150 nanometers.

The amount of high molecular weight amorphous polyester resin in a toner particle of the present disclosure, whether in any core, any shell, or both, may be from about 25% to about 50% by weight of the toner, in embodiments from about 30% to about 45% by weight, in other embodiments or from about 40% to about 43% by weight of the toner (that is, toner particles exclusive of external additives and water).

The ratio of crystalline resin to the low molecular weight amorphous resin to high molecular weight amorphous polyester resin can be in the range from about 1:1:98 to about 98:1:1 to about 1:98:1, in embodiments from about 1:5:5 to about 1:9:9, in embodiments from about 1:6:6 to about 1:8:8.

In embodiments, resins, waxes, and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered. Thus, in embodiments, the toner particles herein comprise emulsion aggregation toner particles.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Examples of nonionic surfactants include polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxytheylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL® CA-210, IGEPAL® CA-520, IGEPAL® CA-720, IGEPAL® CO-890, IGEPAL® CO-720, IGEPAL® CO-290, IGEPAL® CA-210, ANTAROX® 890 and ANTAROX® 897. An example of a suitable nonionic surfactant is ANTAROX® 897 available from Rhone-Poulenc Inc., which consists primarily of alkyl phenol ethoxylate. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be used include sulfates and sulfonates, sodium dodecylsulfate (SDS), sodium dodecyl benzene sulfonate, sodium dodecyl-naphthalene sulfate, dialkyl benzenealkyl sulfates and sulfonates, such as abietic acid, available from Aldrich, and the NEOGEN® brand of anionic surfactants. An example of a suitable anionic surfactant is NEOGEN® R, NEOGEN® RK, and NEOGEN® SC, available from Daiichi Kogyo Seiyaku co. Ltd., or TAYCA POWER BN2060 from Tayca Corporation (Japan), which consists primarily of branched sodium dodecyl benzene sulphonate. Other suitable anionic surfactants include, in embodiments, DOWFAX™ 2A1, an alkyldiphenyloxide disulfonate available from The Dow Chemical Company. Combinations of these surfactants may be used. Combinations of these surfactants and any of the foregoing anionic surfactants may be utilized in embodiments.

Examples of cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecylbenzyl triethyl ammonium chloride, and mixtures thereof. Specific examples include MIRAPOL® and ALKAQUAT® available from Alkaril Chemical Company, SANISOL® (benzalkonium chloride) available from Kao Chemicals, and the like. An example of a suitable cationic surfactant is SANISOL® B-50 available from Kao Corp., which consists primarily of benzyl dimethyl alkonium chloride. Mixtures of these and other surfactants may be utilized in embodiments.

The latex particles produced as described above may be added to a colorant to produce a toner. In embodiments the colorant may be in a dispersion. The colorant dispersion may include, for example, submicron colorant particles having a size of, for example, from about 50 to about 500 nanometers in volume average diameter and, in embodiments, of from about 100 to about 400 nanometers in volume average diameter. The colorant particles may be suspended in an aqueous water phase containing an anionic surfactant, a nonionic surfactant, or combinations thereof. Suitable surfactants include any of those surfactants described above. In embodiments, the surfactant may be ionic and may be present in a dispersion in an amount from about 0.1 to about 25 percent by weight of the colorant, and in embodiments from about 1 to about 15 percent by weight of the colorant.

Colorants useful in forming toners in accordance with the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet, or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants, and the like.

Exemplary colorants include carbon black like REGAL 330® magnetites; Mobay magnetites including MO8029™, M08060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33,2,5-dimethoxy-4-sulfonanilide phenylazo-4'-chloro-2,5-dimethoxy acetoacetanilide, Yellow 180, and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight of the toner, in embodiments, from about 5 to about 18 weight percent of the toner.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, combinations thereof, and the like, may be utilized as the colorant.

In embodiments, toners of the present disclosure may have high pigment loadings. As used herein, high pigment loadings include, for example, toners having a colorant in an amount of from about 4 percent by weight of the toner to about 40 percent by weight of the toner, in embodiments from about 5 percent by weight of the toner to about 15 percent by weight of the toner. These high pigment loadings may be important for certain colors such as Magenta, Cyan, Black, PANTONE® Orange, Process Blue, PANTONE® yellow, and the like. (The PANTONE® colors refer to one of the most popular color guides illustrating different colors, wherein each color is associated with a specific formulation of colorants, and is published by PANTONE, Inc., of Moonachie, N.J.) One issue with high pigment loading is that it may reduce the ability of the toner particles to spherodize, that is, to become circular, during the coalescence step, even at a very low pH.

The resulting latex, optionally in a dispersion, and colorant dispersion may be stirred and heated to a temperature of from about 35° C. to about 70° C., in embodiments of from about 40° C. to about 65° C., resulting in toner aggregates of from about 2 microns to about 10 microns in volume average diameter, and in embodiments of from about 5 microns to about 8 microns in volume average diameter.

Optionally, a wax may also be combined with the resin in forming toner particles. When included, the wax may be present in an amount of, for example, from about 1 weight percent to about 25 weight percent of the toner particles, in embodiments from about 5 weight percent to about 20 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents.

The toner particles may be prepared by any method within the purview of one skilled in the art. Although embodiments relating to toner particle production are described below with respect to emulsion-aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. In embodiments, toner compositions and toner particles may be prepared by aggregation and coalescence processes in which small-size resin particles are aggregated to the appropriate toner particle size and then coalesced to achieve the final toner-particle shape and morphology.

In embodiments, toner compositions may be prepared by emulsion-aggregation processes, such as a process that includes aggregating a mixture of an optional wax and any other desired or required additives, and emulsions including the resins described above, optionally in surfactants as described above, and then coalescing the aggregate mixture. A mixture may be prepared by adding an optional wax or other materials, which may also be optionally in a dispersion(s) including a surfactant, to the emulsion, which may be a mixture of two or more emulsions containing the resin. The pH of the resulting mixture may be adjusted by an acid such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 600 to about 4,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture. This provides a sufficient amount of agent for aggregation.

In order to control aggregation and coalescence of the particles, in embodiments the aggregating agent may be metered into the mixture over time. For example, the agent may be metered into the mixture over a period of from about 5 to about 240 minutes, in embodiments from about 30 to about 200 minutes. The addition of the agent may also be done while the mixture is maintained under stirred conditions, in embodiments from about 50 rpm to about 1,000 rpm, in other embodiments from about 100 rpm to about 500 rpm, and at a temperature that is below the glass transition temperature of the resin as discussed above, in embodiments from about 30° C. to about 90° C., in embodiments from about 35° C. to about 70° C.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted. In embodiments, the predetermined desired particle size is within the toner particle size ranges mentioned above.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

In embodiments, after aggregation, but prior to coalescence, a shell may be applied to the aggregated particles.

Resins which may be utilized to form the shell include, but are not limited to, the amorphous resins described above for use in the core. Such an amorphous resin may be a low molecular weight resin, a high molecular weight resin, or combinations thereof. In embodiments, an amorphous resin which may be used to form a shell in accordance with the present disclosure may include an amorphous polyester of formula I above.

In some embodiments, the amorphous resin utilized to form the shell may be crosslinked. For example, crosslinking may be achieved by combining an amorphous resin with a crosslinker, sometimes referred to herein, in embodiments, as an initiator. Examples of suitable crosslinkers include, but are not limited to, for example free radical or thermal initiators such as organic peroxides and azo compounds described above as suitable for forming a gel in the core. Examples of suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di(2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di(benzoyl peroxy) hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di(t-butyl peroxy) hexane, t-butyl cumyl peroxide, α-α-bis (t-butyl peroxy)diisopropyl benzene, di-t-butyl peroxide and 2,5-dimethyl 2,5di(t-butyl peroxy) hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di(t-butyl peroxy) valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy) butane, ethyl 3,3-di(t-butyl peroxy) butyrate and ethyl 3,3-di(t-amyl peroxy) butyrate, and combinations thereof. Examples of suitable azo compounds include 2,2'-azobis(2,4-dimethylpentane nitrile), azobis-isobutyronitrile, 2,2-azobis(isobutyronitrile), 2,2-azobis(2,4-dimethyl valeronitrile), 2,2'-azobis(methyl butyronitrile), 1,1'-azobis(cyano cyclohexane), other similar known compounds, and combinations thereof.

The crosslinker and amorphous resin may be combined for a sufficient time and at a sufficient temperature to form the crosslinked polyester gel. In embodiments, the crosslinker and amorphous resin may be heated to a temperature of from about 25° C. to about 99° C., in embodiments from about 30° C. to about 95° C., for a period of time from about 1 minute to about 10 hours, in embodiments from about 5 minutes to about 5 hours, to form a crosslinked polyester resin or polyester gel suitable for use as a shell.

Where utilized, the crosslinker may be present in an amount of from about 0.001% by weight to about 5% by weight of the resin, in embodiments from about 0.01% by weight to about 1% by weight of the resin. The amount of CCA may be reduced in the presence of crosslinker or initiator.

A single polyester resin may be utilized as the shell or, as noted above, in embodiments a first polyester resin may be combined with other resins to form a shell. Multiple resins may be utilized in any suitable amounts. In embodiments, a first amorphous polyester resin, for example a low molecular weight amorphous resin of formula I above, may be present in an amount of from about 20 percent by weight to about 100 percent by weight of the total shell resin, in embodiments from about 30 percent by weight to about 90 percent by weight of the total shell resin. Thus, in embodiments a second resin, in embodiments a high molecular weight amorphous resin, may be present in the shell resin in an amount of from about 0 percent by weight to about 80 percent by weight of the total shell resin, in embodiments from about 10 percent by weight to about 70 percent by weight of the shell resin.

Following aggregation to the desired particle size and application of any optional shell, the particles may then be coalesced to the desired final shape, the coalescence being achieved by, for example, heating the mixture to a temperature from about 45° C. to about 100° C., in embodiments from about 55° C. to about 99° C., which may be at or above the glass transition temperature of the resins utilized to form the toner particles, and/or reducing the stirring, for example to from about 100 rpm to about 400 rpm, in embodiments from about 200 rpm to about 300 rpm. The fused particles can be measured for shape factor or circularity, such as with a SYSMEX FPIA 2100 analyzer, until the desired shape is achieved.

Coalescence may be accomplished over a period of time from about 0.01 to about 9 hours, in embodiments from about 0.1 to about 4 hours.

In embodiments, after aggregation and/or coalescence, the pH of the mixture may then be lowered to from about 3.5 to about 6 and, in embodiments, to from about 3.7 to about 5.5 with, for example, an acid, to further coalesce the toner aggregates. Suitable acids include, for example, nitric acid, sulfuric acid, hydrochloric acid, citric acid and/or acetic acid. The amount of acid added may be from about 0.1 to about 30 percent by weight of the mixture, and in embodiments from about 1 to about 20 percent by weight of the mixture.

The mixture may be cooled, washed and dried. Cooling may be at a temperature of from about 20° C. to about 40° C., in embodiments from about 22° C. to about 30° C., over a period of time of from about 1 hour to about 8 hours, in embodiments from about 1.5 hours to about 5 hours.

In embodiments, cooling a coalesced toner slurry may include quenching by adding a cooling media such as, for example, ice, dry ice and the like, to effect rapid cooling to a temperature of from about 20° C. to about 40° C., in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture may not be feasible or practical, neither by the introduction of a cooling medium into the toner mixture, or by the use of jacketed reactor cooling.

Subsequently, the toner slurry may be washed. The washing may be carried out at a pH of from about 7 to about 12, in embodiments at a pH of from about 9 to about 11. The washing may be at a temperature of from about 30° C. to about 70° C., in embodiments from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

In embodiments, a toner process herein comprises contacting at least one resin; an optional wax; an optional colorant; and an optional aggregating agent; heating to form aggregated toner particles; optionally, adding a shell resin to the aggregated toner particles, and heating to a further elevated temperature to coalesce the particles; adding a surface additive, wherein the surface additive comprises: a first monomer having a high carbon to oxygen ratio of from about 3 to about 8; a second monomer comprising two or more vinyl groups, wherein the second monomer is present in the copolymer in an amount of from greater than about 8 percent by weight to about 40 percent by weight, based on the weight of the copolymer; optionally, a third monomer comprising an amine, wherein the third monomer is present in an amount of from about 0.5 percent by weight to about 1.5 percent by weight, based on the weight of the copolymer; and a surfactant, wherein the surfactant has a minimum surface tension at critical micelle concentration of less than about 30 mN/m; wherein the copolymer toner surface additive has a volume average particle diameter of from about 20 nanometers to less than 70 nanometers; and optionally, recovering the toner particles.

In embodiments, toner particles may contain the polymeric composition of the present disclosure described above, as well as other optional additives, as desired or required. For example, the toner may include positive or negative charge control agents, for example in an amount from about 0.1 to about 10 weight percent of the toner, in embodiments from about 1 to about 3 weight percent of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference herein in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Orient Chemical Industries, Ltd.); combinations thereof, and the like. Such charge control agents may be applied simultaneously with the shell resin described above or after application of the shell resin.

There can also be blended with the toner particles external additive particles after formation including flow aid additives, which additives may be present on the surface of the toner particles. Examples of these additives include metal oxides such as titanium oxide, silicon oxide, aluminum oxides, cerium oxides, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN 700, and mixtures thereof. In embodiments, the toners herein further comprise cleaning additives selected from the group consisting of stearates, cerium oxide, strontium titanate, and combinations thereof.

In general, silica may be applied to the toner surface for toner flow, triboelectric charge enhancement, admix control, improved development and transfer stability, and higher toner blocking temperature. Titania may be applied for improved relative humidity (RH) stability, triboelectric charge control and improved development and transfer stability. Zinc stearate, calcium stearate and/or magnesium stearate may optionally also be used as an external additive for providing lubricating properties, developer conductivity, triboelectric charge enhancement, enabling higher toner charge and charge stability by increasing the number of contacts between toner and carrier particles. In embodiments, a commercially available zinc stearate known as Zinc Stearate L, obtained from Ferro Corporation, may be used. The external surface additives may be used with or without a coating.

In embodiments, the toner further comprises a member of the group consisting of a silica surface additive, a titania surface additive, and combinations thereof. In embodiments, the toner comprises a silica additive, a titania additive, or a combination thereof, and at least one of the silica or titania additives has a hydrophobic treatment, in embodiments, one or more of the silica or titania additives has a polydimethylsiloxane hydrophobic treatment.

Each of these external additives may be present in an amount from about 0 parts per hundred to about 3 parts per hundred of the toner, in embodiments from about 0.25 parts per hundred to about 2.5 parts per hundred of the toner, although the amount of additives can be outside of these ranges. In embodiments, the toners may include, for example, from about 0 parts per hundred to about 3 parts per hundred titania, from about 0 parts per hundred to about 3 parts per hundred silica, and from about 0 parts per hundred to about 3 parts per hundred zinc stearate.

In embodiments, in addition to the polymeric additive of the present disclosure, toner particles may also possess silica in amounts of from about 0.1 parts per hundred to about 5 parts per hundred by weight of the toner particles, in embodiments from about 0.2 parts per hundred to about 2 parts per hundred by weight of the toner particles, and titania in amounts of from about 0 parts per hundred to about 3 parts per hundred by weight of the toner particles, in embodiments from about 0.1 parts per hundred to about 1 parts per hundred by weight of the toner particles.

In certain embodiments, the present toners include reduced amounts of titania as compared to prior toner. In certain embodiments, the toner contains a titania surface additive in an amount of less than about 1 part per hundred by weight, based upon a total weight of the toner components.

In certain embodiments, the present toners are free of titania surface additive. That is, the toners do not contain any titania surface additive.

In embodiments, the toner contains at least one hydrophobic silica surface additive; and the toner is free of titania surface additive; or in other embodiments, the toner contains at least one hydrophobic silica surface additive; and the toner contains a titania surface additive in an amount of less than about 1 part per hundred by weight, based upon a total weight of the toner components.

In embodiments, the toner further contains at least one hydrophobic silica surface additive and a sol-gel silica surface additive.

In embodiments, the copolymer toner additive is present in the toner in an amount of from about 0.1 to about 2 parts per hundred by weight based on 100 parts by weight of best toner particles. In embodiments, the copolymer toner additive is present in the toner in an amount of 0.75 to about 1.5 percent by weight, based upon a total weight of the toner components. In certain embodiments, the copolymer toner additive is present in the toner in an amount of from about 0.75 to about 1.5 parts per hundred by weight, based on 100 parts by weight of the base toner particles; the toner further comprises a silica surface additive present in the toner in an amount of from about 1.7 to about 2.9 parts per hundred by weight, based on 100 parts by weight of the base toner particles; and the toner further comprises a titania additive present in the toner in an amount of less than 1 part per hundred by weight, based on 100 parts by weight of base toner particles.

In embodiments one or more of the silica or titania additives has a polydimethylsiloxane hydrophobic treatment. In embodiments, the total loading of the cross-linked polymeric toner additive and the silica loading is greater than or equal to 2.8 parts per hundred by weight of 100 parts by weight of base toner particles.

Suitable additives further include those disclosed in U.S. Pat. Nos. 3,590,000, and 6,214,507, the disclosures of each of which are hereby incorporated by reference in their entirety. Again, these additives may be applied simultaneously with the shell resin described above or after application of the shell resin.

In embodiments, toners of the present disclosure may be utilized as ultra low melt (ULM) toners. In embodiments, the dry toner particles having a core and/or shell may, exclusive of external surface additives, have one or more the following characteristics:

(1) Volume average diameter (also referred to as "volume average particle diameter") of from about 3 to about 25 micrometers ($\mu$m), in embodiments from about 4 to about 15 $\mu$m, in other embodiments from about 5 to about 12 $\mu$m.

(2) Number Average Geometric Size Distribution (GSDn) and/or Volume Average Geometric Size Distribution (GSDv): In embodiments, the toner particles described in (1) above may have a narrow particle size distribution with a lower number ratio GSD of from about 1.15 to about 1.38, in other embodiments, less than about 1.31. The toner particles of the present disclosure may also have a size such that the upper GSD by volume in the range of from about 1.20 to about 3.20, in other embodiments, from about 1.26 to about 3.11. Volume average particle diameter D50V, GSDv, and GSDn may be measured by means of a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3.

(3) Shape factor of from about 105 to about 170, in embodiments, from about 110 to about 160, SF1*a. Scanning electron microscopy (SEM) may be used to determine the shape factor analysis of the toners by SEM and image analysis (IA). The average particle shapes are quantified by employing the following shape factor (SF1*a) formula:

$$SF1\text{*}a = 100 7\pi d^2/(4A),$$

where A is the area of the particle and d is its major axis. A perfectly circular or spherical particle has a shape factor of exactly 100. The shape factor SF1*a increases as the shape becomes more irregular or elongated in shape with a higher surface area.

(4) Circularity of from about 0.92 to about 0.99, in other embodiments, from about 0.94 to about 0.975. The instrument used to measure particle circularity may be an FPIA-2100 manufactured by SYSMEX, following the manufacturer's instructions.

The characteristics of the toner particles may be determined by any suitable technique and apparatus and are not limited to the instruments and techniques indicated hereinabove.

The toner particles thus formed may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 to about 70 weight % to about 70 to about 30 weight %, in embodiments from about 40 to about 60 weight % to about 60 to about 40 weight %. The coating may have a coating weight of, for example, from about 0.1 to about 5% by weight of the carrier, in embodiments from about 0.5 to about 2% by weight of the carrier.

In embodiments, PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 to about 10 percent by weight, in embodiments from about 0.01 percent to about 3 percent by weight, based on the weight of the coated carrier particles, until adherence thereof to the carrier core by mechanical impaction and/or electrostatic attraction.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 µm in size, in embodiments from about 50 to about 75 µm in size, coated with about 0.5% to about 10% by weight, in embodiments from about 0.7% to about 5% by weight of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

The toners can be utilized for electrostatographic or electrophotographic processes. In embodiments, any known type of image development system may be used in an image developing device, including, for example, magnetic brush development, jumping single-component development, hybrid scavengeless development (HSD), and the like. These and similar development systems are within the purview of those skilled in the art.

Imaging processes include, for example, preparing an image with an electrophotographic device including a charging component, an imaging component, a photoconductive component, a developing component, a transfer component, and a fusing component. In embodiments, the development component may include a developer prepared by mixing a carrier with a toner composition described herein. The electrophotographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., in embodiments from about 80° C. to about 150° C., in other embodiments from about 90° C. to about 140° C., after or during melting onto the image receiving substrate.

In embodiments where the toner resin is crosslinkable, such crosslinking may be accomplished in any suitable manner. For example, the toner resin may be crosslinked during fusing of the toner to the substrate where the toner resin is crosslinkable at the fusing temperature. Crosslinking also may be effected by heating the fused image to a temperature at which the toner resin will be crosslinked, for example in a post-fusing operation. In embodiments, crosslinking may be effected at temperatures of from about 160° C. or less, in embodiments from about 70° C. to about 160° C., in other embodiments from about 80° C. to about 140° C.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of 2 L Latex. A polymeric latex was synthesized by a semi-continuous starve-fed emulsion polymerization process. An aqueous surfactant solution containing 35.70 grams 20.9% solution of Tayca BN2060 (a dodecylbenzene sulfonate anionic emulsifier) and about 836.9 grams of de-ionized water was prepared by combining the two in a beaker and mixing for about 2 minutes. The aqueous surfactant solution was then transferred into a 2 L buchi reactor. The reactor was continuously purged with nitrogen while being stirred at about 400 revolutions per minute (rpm). The reactor was then heated to about 77° C. over 30 minutes. In a separate glass beaker, 241.3 grams of cyclohexyl methacrylate (CHMA), 81.3 grams of divinylbenzene 55% technical grade (DVB-55), and 2.60 grams of 2-(dimethylamino)ethyl methacrylate (DMAEMA) were added and mixed slowly. An aqueous surfactant solution of 83.30 grams 20.9% solution of Tayca BN2060 and 324.4 grams de-ionized water was prepared and mixed in a separate beaker. An emulsified monomer mixture was prepared by pouring the aqueous surfactant solution into the monomer solution and rapidly mixing until a pale pink solution was formed. About 5 percent by weight of this emulsified solution was added to the aqueous surfactant mixture in the reactor as a seed once the reactor temperature of 77° C. had been reached. Separately, 1.25 grams of ammonium persulfate (APS) initiator was dissolved in about 13 grams of de-ionized water to form an initiator solution. The initiator solution was added to the reactor over 7 minutes (2 grams/minute) to polymerize the seed particles. After 15 minutes, the rest of the emulsified monomer solution was continuously fed into the reactor using a metering pump at a controlled rate of about 6 grams/minute. An hour into the monomer addition, the reactor rpm was increased to 450 rpm. Once all the monomer emulsion was charged into the main reactor, the temperature was held at about 77° C. for an additional 1 hour to complete the reaction. Full cooling was then applied and the reactor temperature was reduced to about 45° C. The final latex was filtered through a 25 micron sieve. The resulting product had a solids content of 20.6% and a particle size of 49.3 nanometers. Particle size was determined using a Nanotrac NPA252 with the following settings: Distribution—Volume, Progression—Geom 4 Root, Residuals—Enabled, Particle Refractive Index—1.59, Transparency—Transparent, and Particle Shape—Spherical.

Example 2

Preparation of 5 Gallon Latex. A polymeric latex was synthesized by a semi-continuous starve-fed emulsion polymerization process. An emulsified monomer mixture was prepared in a portable tank by mixing monomers, 2.671 kilograms cyclohexyl methacrylate (CHMA), 0.9 kilograms divinylbenzene 55% technical grade (DVB-55), and 28.81 grams 2-(dimethylamino)ethyl methacrylate (DMAEMA) into a surfactant solution containing 922.14 grams 20.9% Tayca BN2060 solution and 3.591 kg deionized water.

A separate aqueous phase mixture was prepared in a 5-gallon reaction vessel by mixing 395.2 grams 20.9% Tayca BN2060 solution with 9.265 kilograms deionized water which was then heated to 77° C. with continuous mixing at 225 rpm. A polymer seed was prepared by adding 3% of the emulsified monomer into the reactor and mixing for a minimum of 15 minutes. After the reactor's temperature reached around 77° C., the initiator solution of 0.403 kg deionized water and 13.83 grams ammonium persulfate (APS) were added over 7 minutes to polymerize the seed particles. Following a 15 minute wait time, the remaining emulsified monomer was added at a controlled feed rate to the reactor over a two hours period to polymerize and grow the polymer seed particles. Once the monomer feeding is complete, the reactor was held at the reaction temperature for an extra hour, then ramped over 2 hours to an elevated temperature of 87° C. and held for an additional 2 hours to lower the residual monomers levels. During the post reaction process the latex was buffered with 0.1 M sodium hydroxide (NaOH) solution to maintain pH between 5.5 and 6.0. The latex was then cooled to room temperature and discharged through 5 micron welded polypropylene filter bag. The resulting product was an aqueous polymer latex that contains about 20 weight % solids. The final particle size of the latex was 47 nanometers.

The 5-gallon latex was spray dried using a dual liquid nozzle DL41 spray dryer from Yamato Scientific Co. with drying conditions of:

Atomizing pressure: 4 kgf/cm$^2$

Sample feed rate: 3 (0.6 liters/minute)

Temperature: 140° C.

Aspirator flow rate: 4 m$^3$/minute

A series of organic additives were prepared using the polymeric composition of 74.2% CHMA, 25% DVB and 0.8% DMAEMA and Tayca BN2060 surfactant, using the basic process described above for Example 1 at 2-L and the basic process for Example 2 at 5-gallon. In the lab 2-L scale only the first 1 hour 77° C. post-reaction was done. This post-reaction step is to reduce residual monomer, since the lab runs were only intended to understand the particle size drivers, not for evaluation. The 5-gallon scale runs used the full post-reaction conditions, 1 hour at 77° C., then a 2 hour ramp to 87° C., plus a further 2 hours at 87° C. Tables 1, 2, and 3 show formulation, process parameters, and latex analytical parameters.

TABLE 1

| | Formulation | | | | | |
|---|---|---|---|---|---|---|
| Example | % Solids | Surfactant | % Surfactant | % Surfactant Upfront | % APS | % Seed |
| 1 | 20 | Tayca | 1.24 | 30 | 0.38 | 5 |
| 2 | 20 | Tayca | 1.24 | 30 | 0.38 | 3 |

TABLE 2

Process Parameters

| Example | Reactor Size | Mixing RPM | Monomer Feed Time (Hours) | Post Reaction Cooking | Total Post Reaction Time (Hours) |
|---|---|---|---|---|---|
| 1 | 2 L | 400/450 | 2 | 1 Hour at 77° C. plus 2 hour ramp to 87° C. plus 1 hour at 87° C. | 1 |
| 2 | 5 Gallon | 225/275 | 2 | | 2 |

TABLE 3

Latex Analytical Parameters

| Example | Particle Size (nanometers) | CHMA (ppm) | DVB (ppm) | Total (ppm) |
|---|---|---|---|---|
| 1 | 49.3 | NA | NA | NA |
| 2 | 47 | <30 | <40 | <70 |

As described in U.S. patent application Ser. No. 16/369,126, filed concurrently herewith, using sodium lauryl sulphate as a surfactant, after extensive work, was found to produce a particle size of as small as 54 nanometers at 2-L scale and at 5-gallon scale, a smallest size of 59 nanometers was achieved (see Example 8 and Example 6, respectively, of U.S. patent application Ser. No. 16/369,126. With the inventive process herein, as shown in Examples 1 and 2, with a change to dodecylbenzenesulfonate (DDBS) it was possible to prepare latex under 50 nanometers in size, at 5-gallon scale, to 47 nanometers in size.

According to an article by P. Peungjitton et al, J. Surfact. Deterg. (2009, 12:85-89), at the critical micelle concentration the dodecylbenzenesulfonate (DDBS) surface tension is 28 mN/m (Millinewton per meter), while according to C. C. Addison et al, J. Chem. Soc. (1948, 943), for sodium lauryl sulfate (SLS) surfactant the minimum surface tension at the critical micelle concentration is higher at about 37 mN/m. So the ratio of minimum surface tension for DDBS to SLS at their critical micelle concentrations is 0.76, while the results of the present disclosure with DDBS and commonly assigned co-filed application Ser. No. 16/369,126 with SLS show a ratio of latex particle sizes of 0.80, comparing the 5-gal result of 47 nm herein to the size of 59 nm from the 5-gal in the co-filed application. This shows that the particle size is approximately proportional to the minimum surface tension of the surfactant at the critical micelle concentration. Thus, one feature of the present disclosure is to provide an emulsion polymerized organic additive latex prepared with a surfactant surface tension of less than 30 Millinewton per meter (mN/m). Some examples of such surfactants include trisiloxane aqueous solutions that have a minimum surface tension of from about 20 to about 25 mN/m and fluorosurfactant aqueous solutions that have a minimum surface tension of from about 15 to about 20 mN/m. See N. M. Kovalchuk et al., Advances in Colloid and Interface Science (2014, 210:65-71). S. Alexander et al., Langmuir (2014, 30:3413-3421) characterizes a class of highly branched hydrocarbon surfactants with surface tensions of approximately 24 mN/m.

To address environmental concerns of fluorosurfactants regarding potential issues around bioaccumulation and environmental impact, 3M has created a nonafluorobutanesulphonyl fluoride intermediate that is converted into fluorosurfactants through a sulphonamide process. These new materials have a perfluoroalkyl group with n≤4 and are not of as much concern from a regulatory perspective as are fluorochemicals with n>4. Previously commercialized under the Fluorad™ trademark, they are now replaced by Novec™, with surface tensions of from about 15 to about 21 mN/m at a concentration of $10^{-5}$ to $10^{-3}$ mol/L in pH 8 buffered aqueous solutions (Farn, R. J. (Ed.). (2006), Chemistry and Technology of Surfactants, Blackwell Publishing Ltd.).

Toner Evaluation.

Toner examples were blended on a 10-L Henschel blender for 10 minutes at 2640 rpm with the additive formulations shown in Table 4 onto XEROX® 700 Digital Color Press black toner particles. All examples included RY50L, a 40 nanometer hydrophobic silica and X24 a hydrophobic 93 to 130 nanometer sol-gel silica, and also included $SrTiO_3$ and zinc stearate as photoreceptor cleaning additives. Toner Comparative Example 1 included 0.8 pph of JMT2000, which is a 15X15X40 nanometer hydrophobic titania. The Toner Comparative Example 2 replaced the JMT2000 titania with 0.55 pph of the 63 nm polymeric additive of Example 2 in U.S. patent application Ser. No. 16/369,126, filed concurrently herewith, using sodium lauryl sulphate as a surfactant. The Toner Example 3 in Table 4 replaced the JMT2000 titania with 0.55 pph of the 47 nm polymeric additive of Example 2 using sodium dodecylbenzene sulphonate as a surfactant. The amount of the polymeric additive used was calculated to replace the JMT2000 at a coverage of about 15% for Toner Comparative Example 2, compared to about 20% for JMT2000 in Toner Comparative Example 1, and about 20% for Toner Example 3. Thus an advantage of the smaller size of the inventive polymeric additive of Toner Example 3 is that the effective surface area of the coverage of the toner is higher, even though the same weight % of the toner is utilized. One anticipated advantage in toner use in an electrophotographic printer with higher surface area coverage is better aging performance when the toner particles are aged in the developer housing for longer periods of time. The residence time of toner in a printer may be up to about 120 minutes. The surface area coverage was calculated using the relationship: % SAC=(w●D●P)/(0.363●d●p)●100%. In this relationship, for the toner, D is the D50 average size in microns and P is the true density, the specific gravity, in grams/cm³, and for the surface additive, d is the D50 average size in nanometers, p is the true density or specific gravity in grams/cm³, and w is the weight of the additive added to the toner particles in pph.

TABLE 4

| Toner Comparative Example 1 | Toner Comparative Example 2 | Toner Example 3 |
|---|---|---|
| 2.3 pph RY50L silica | 2.3 pph RY50L silica | 2.3 pph RY50L silica |
| 0.8 pph JMT2000 titania | 0.55 pph 63 nm polymeric additive | 0.55 pph 47 nm Example 2 polymeric additive |
| 0.14 pph $SrTiO_3$ | 0.14 pph $SrTiO_3$ | 0.14 pph $SrTiO_3$ |
| 0.09 zinc stearate | 0.09 zinc stearate | 0.09 zinc stearate |
| 1.4 pph X24 | 1.4 pph X24 | 1.4 pph X24 |

Bench evaluation was done for each of the three toner blends in Table 4 and the results tabulated in Table 5. For each blended toner, a developer was prepared comprising 1.5 grams of toner and 30 grams of Xerox® 700 carrier in a 60 mL glass bottle. Samples were conditioned three days in a low-humidity zone (J zone) at 21.1° C. and 10% relative humidity, and in a separate sample in a high humidity zone (A zone) at about 28° C. and 85% relative humidity. The developers with additive blended toner were charged in a Turbula® mixer for 60 minutes.

The triboelectric charge of the toner was measured using a charge spectrograph using a 100 V/cm field. The toner charge (Q/D) was measured visually as the midpoint of the toner charge distribution. The charge was reported in millimeters of displacement from the zero line. (The displacement in millimeters can be converted to Q/D charge in femtocoulombs per micron by multiplication by 0.092 femtocoulombs/mm.)

The blended toner charge per mass ratio (Q/M) was also determined by the total blow-off charge method, measuring the charge on a faraday cage containing the developer after removing the toner by blow-off in a stream of air. The total charge collected in the cage is divided by the mass of toner removed by the blow-off, by weighing the cage before and after blow-off to give the Q/M ratio. The Toner Example 3 replacing the JMT2000 with the inventive polymeric additive of Example 2, shows J and A zone charge that is similar to the Comparative Toner Example 1, with just a little lower charge in J-zone. The charge level is a better match to Comparative Toner Example 1 than shown by the Comparative Toner Example 2 with the larger size polymeric additive prepared with sodium lauryl sulphate. Both examples with the polymeric additive show a lower and better J/A RH ratio for charging.

TABLE 5

| Toner Example | Q/M | | | Q/D | | | Flow Cohesion (%) | Blocking (° C.) |
|---|---|---|---|---|---|---|---|---|
| | J | A | J/A | J | A | J/A | | |
| Comparative Toner Example 1 | 56 | 27 | 2.07 | 10.9 | 5.5 | 2.07 | 18 | 53.3 |
| Comparative Toner Example 2 | 45 | 24 | 1.88 | 8.9 | 4.9 | 1.88 | 61 | 54.0 |
| Toner Example 3 | 50 | 27 | 1.85 | 10.6 | 5.4 | 1.96 | 54 | 52.6 |

Toner Flow Cohesion Measurement was also evaluated on the three toners in Table 4 with the results shown in Table 5. Two grams of the blended toner at lab ambient conditions is placed on the top screen in a stack of three pre-weighed mesh sieves, which are stacked as follows in a Hosokawa flow tester: 53 micrometers (μm) on top, 45 μm in the middle, and 38 μm on the bottom. A vibration of 1 millimeter amplitude is applied to the stack for 90 seconds. The flow cohesion % is calculated as: % Cohesion=(50*A+30*B+10*C). The inventive Toner Example 3 also shows better flow cohesion than the polymeric additive of Comparative Toner Example 2, though still worse flow than the Comparative Toner Example 1.

The toner blocking was also measured for all the toners in Table 4 with the results shown in Table 5. Toner blocking was determined by measuring the toner cohesion at elevated temperature above room temperature for the toner blended with surface additives. Toner blocking measurement was completed as follows: two grams of additive blended toner is weighed into an open dish and conditioned in an environmental chamber at the specified elevated temperature and 50% relative humidity. After about 17 hours, the samples are removed and acclimated in ambient conditions for about 30 minutes. Each re-acclimated sample is measured by sieving through a stack of two pre-weighed mesh sieves, which are stacked as follows: 1000 μm on top and 106 μm on bottom. The sieves are vibrated for about 90 seconds at about 1 millimeter amplitude with a Hosokawa flow tester. After the vibration is completed, the sieves are re-weighed and toner blocking is calculated from the total amount of toner remaining on both sieves as a percentage of the starting weight. Thus, for a 2 gram toner sample, if A is the weight of toner left on the top 1000 μm screen and B is the weight of toner left on the bottom 106 μm screen, the toner blocking percentage is calculated by: % blocking=50 (A+B). Blocking was a little lower with Toner Example 3 compared to Comparative Toner Example 1 and to Comparative Toner Example 2, but was well above the minimum requirement of 50.5° C.

Overall, it has been demonstrated herein that the inventive polymeric additive of 47 nanometers in volume average particle size diameter, is effective to lower charge similar to titania while providing good flow and blocking and thus can potentially replace some or all of the titania in a toner formulation. Compared to the previous polymeric additive prepared with sodium lauryl sulphate with larger particle size the charge match to titania is better and the surface area coverage of the toner is higher, which can help provide better maintenance of toner performance with toner aging in an electrophotographic developer housing.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A polymeric composition comprising:
    a copolymer comprising:
        a first monomer having a high carbon to oxygen ratio of from about 3 to about 8;
        a second monomer comprising two or more vinyl groups, wherein the second monomer is present in the copolymer in an amount of from greater than about 8 percent by weight to about 40 percent by weight, based on the weight of the copolymer; and
        optionally, a third monomer comprising an amine, wherein the third monomer, if present, is present in an amount of from about 0.1 percent by weight to about 1.5 percent by weight, based on the weight of the copolymer; and
    a surfactant, wherein the surfactant has a minimum surface tension at critical micelle concentration of less than about 30 mN/m, and wherein the surfactant is a non-sodium lauryl sulfate surfactant;
    wherein the copolymer toner additive has a volume average particle diameter of from about 20 nanometers to less than 50 nanometers.

2. The polymeric composition of claim 1, wherein the surfactant has a minimum surface tension at critical micelle concentration;
   wherein sodium lauryl sulphate has a minimum surface tension at its critical micelle concentration;
   and wherein the minimum surface tension at critical micelle concentration of the surfactant is lower than the minimum surface tension at critical micelle concentration of sodium lauryl sulphate.

3. The polymeric composition of claim 1, wherein the surfactant has a minimum surface tension at critical micelle concentration of from about 15 to about 25 mN/m.

4. The polymeric composition of claim 1, wherein the surfactant is a dodecylbenzene sulfonate.

5. The polymeric composition of claim 1, wherein the surfactant is selected from the group consisting of $((CH_3)_3SiO_2)_2Si—(CH_3)(CH_2)_3(OCH_2CH_2)_nOH$ wherein n is from about 4 to about 12, oxyethylated alcohols, dimethyldidodecyl-ammonium bromide, perfluorocarboxylic acids and salts thereof, perfluoroalkanesulfonic acid salts, isostearyl sulphate salts, $(CH_3)_3CCH_2CH(CH_3)CH_2PO_4Na$, dioctyl ammonium sulfosuccinate, dioctyl triethylamine sulfosuccinate, dioctyl trimethylamine sulfosuccinate, dioctyl tetrapropylammonium sulfosuccinate, and combinations thereof.

6. The polymeric composition of claim 1, wherein the polymeric composition comprises latex particles of the copolymer and the surfactant.

7. The polymeric composition of claim 1, where the critical micelle concentration cannot be reached, wherein the surfactant has a minimum surface tension of from about 15 to less than about 30 mN/m.

8. The polymeric composition of claim 1, wherein the polymeric composition comprises a latex including latex particles of the copolymer and the surfactant, and water;
   wherein the copolymer comprises monomers;
   wherein the latex further comprises initiator;
   and wherein the surfactant is present in an amount of from about 0.3 to about 2 percent by weight, based upon the weight of all ingredients in the latex, including the monomers, the water, the initiator, and the surfactant.

9. The polymeric composition of claim 1, wherein the first monomer comprises an aliphatic cycloacrylate selected from the group consisting of cyclohexyl methacrylate, cyclopropyl acrylate, cyclobutyl acrylate, cyclopentyl acrylate, cyclohexyl acrylate, cyclopropyl methacrylate, cyclobutyl methacrylate, cyclopentyl methacrylate, isobornyl methacrylate, and combinations thereof.

10. The polymeric composition of claim 1, wherein the first monomer is cyclohexyl methacrylate.

11. The polymeric composition of claim 1, wherein the second monomer is divinyl benzene.

12. The polymeric composition of claim 1, wherein the third monomer comprises a member of the group consisting of dimethylaminoethyl methacrylate, diethylaminoethyl methacrylate, dipropylaminoethyl methacrylate, diisopropylaminoethyl methacrylate, dibutylaminoethyl methacrylate, and combinations thereof.

13. The polymeric composition of claim 1, wherein the third monomer dimethylaminoethyl methacrylate.

14. The polymeric composition of claim 1, wherein the first monomer is cyclohexyl methacrylate;
   wherein the second monomer is divinyl benzene;
   wherein the third monomer is dimethylaminoethyl methacrylate; and
   wherein the surfactant is a dodecylbenzene sulfonate.

* * * * *